(12) United States Patent
Yu et al.

(10) Patent No.: US 9,497,450 B2
(45) Date of Patent: Nov. 15, 2016

(54) METHOD, APPARATUS, AND SYSTEM FOR LOCATING IPTV FAULT

(71) Applicant: HUAWEI TECHNOLOGIES CO., LTD., Shenzhen (CN)

(72) Inventors: Wenxiao Yu, Nanjing (CN); Yinliang Hu, Nanjing (CN); Peilin Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 375 days.

(21) Appl. No.: 14/104,616

(22) Filed: Dec. 12, 2013

(65) Prior Publication Data
US 2014/0139688 A1 May 22, 2014

Related U.S. Application Data

(63) Continuation of application No. PCT/CN2011/078459, filed on Aug. 16, 2011.

(51) Int. Cl.
*H04N 7/18* (2006.01)
*H04N 17/00* (2006.01)
(Continued)

(52) U.S. Cl.
CPC ........ *H04N 17/004* (2013.01); *H04L 41/0677* (2013.01); *H04L 43/0811* (2013.01);
(Continued)

(58) Field of Classification Search
CPC ................ H04N 21/64723; H04N 21/6473; H04N 21/64738; H04N 21/24; H04N 21/2404; H04N 21/2405
USPC ........................................ 725/107
See application file for complete search history.

(56) References Cited

U.S. PATENT DOCUMENTS 7,693,081 B1 4/2010 Zriny et al.
2005/0204397 A1 9/2005 Miyazoe et al.
(Continued)

FOREIGN PATENT DOCUMENTS

CN 2007-10193783 11/2007
CN 101072328 11/2007
(Continued)

OTHER PUBLICATIONS

International Search Report mailed May 24, 2012 in corresponding International Application No. PCT/CN2011/078459.
(Continued)

*Primary Examiner* — John Schnurr
(74) *Attorney, Agent, or Firm* — Staas & Halsey LLP

(57) ABSTRACT

A method, an apparatus, a system locate an IPTV fault, where the method includes: performing synchronized evaluation on a monitored IPTV video stream according to a synchronization message, obtaining multiple corresponding local upstream evaluation results; receiving an evaluation result report message sent by a downstream monitoring point, where the evaluation result report message includes a downstream evaluation result, an evaluation result identifier, and synchronization packet information; finding, according to the synchronization packet information and the evaluation result identifier in the evaluation result report message sent by the downstream monitoring point, an upstream evaluation result corresponding to the downstream evaluation result; comparing the downstream evaluation result with the upstream evaluation result, and performing fault locating according to a result of the comparison. The present disclosure implements IPTV fault locating, saves costs of manpower and material resources, and improves efficiency in fault locating.

20 Claims, 11 Drawing Sheets

Forward through a monitoring center

(51) Int. Cl.
   *H04L 12/26* (2006.01)
   *H04L 12/24* (2006.01)
   *H04N 21/61* (2011.01)
   *H04N 21/6405* (2011.01)
   *H04N 21/647* (2011.01)

(52) U.S. Cl.
   CPC ...... *H04L43/0829* (2013.01); *H04N 21/6125* (2013.01); *H04N 21/6405* (2013.01); *H04N 21/6473* (2013.01)

(56) References Cited

U.S. PATENT DOCUMENTS

| | | |
|---|---|---|
| 2008/0285463 A1 | 11/2008 | Oran |
| 2009/0007210 A1 | 1/2009 | Nishide et al. |
| 2009/0046720 A1 | 2/2009 | Streijl et al. ............ 370/394 |
| 2009/0106809 A1 | 4/2009 | Rahman |
| 2009/0164550 A1 | 6/2009 | Rahrer et al. ............ 709/202 |
| 2013/0279347 A1 | 10/2013 | Liu et al. |

FOREIGN PATENT DOCUMENTS

| | | |
|---|---|---|
| CN | 101170691 | 4/2008 |
| CN | 101483559 | 7/2009 |
| CN | 102137282 | 7/2011 |
| JP | 11-150721 | 6/1999 |
| JP | 2004-165792 | 6/2004 |
| JP | 2009-10815 | 1/2009 |
| JP | 2009-65404 | 3/2009 |
| JP | 2009-290611 | 12/2009 |

OTHER PUBLICATIONS

PCT International Search Report and Written Opinion of the International Searching Authority, mailed May 24, 2012 in corresponding International Patent Application No. PCT/CN2011/078459.

Office Action mailed Mar. 3, 2015 for corresponding Japanese Patent Application No. 2014-519375.

Extended European Search Report issued Feb. 27, 2014, in corresponding European Patent Application No. 11860419.8.

Chinese Office Action dated Apr. 3, 2015 in corresponding Chinese Patent Application No. 201180001417.4.

Forward through a monitoring center

METHOD, APPARATUS, AND SYSTEM FOR LOCATING IPTV FAULT

CROSS-REFERENCE TO RELATED APPLICATIONS

This application is a continuation of International Application No. PCT/CN2011/078459, filed on Aug. 16, 2011, which is hereby incorporated by reference in its entirety.

TECHNICAL FIELD

The present disclosure relates to communications technologies, and in particular, to a method, an apparatus, and a system for locating an IPTV fault.

BACKGROUND

With flexible service features and personalized services, Internet Protocol television (IPTV) witnesses rapid development in recent years. It is necessary to effectively monitor video quality of an IPTV service to ensure smooth carryout of the IPTV service and offer a customer satisfactory and stable video experience.

In the prior art, IPTV video quality monitoring refers to setting multiple monitoring points in a transmission path of a video stream. These monitoring points may be devices that the video stream passes through during transmission, such as a terminal and a router, and may also be video quality monitoring devices specially installed in the transmission path of the video stream. A monitoring point captures in real time a monitored video stream, obtains evaluation results about video quality by analyzing video parameters of the video stream, and reports the evaluation results to a monitoring center. When the video quality decreases to a set threshold, the monitoring center may generate an alarm, and operation and maintenance personnel will analyze the evaluation results and look for a location where a fault occurs.

The following technical problems exist in the preceding IPTV video quality monitoring: A single-point monitoring manner is used during the video quality monitoring, and a monitoring point analyzes only whether the quality of a video that it locally monitors deteriorates; however, if both of two monitoring points that have an upstream/downstream relationship find that the video quality deteriorates, it cannot be determined whether a fault exists between the two monitoring points, for example, whether damage, such as packet loss and jitter, occurs at a place between the two monitoring points, that is, the current video quality monitoring cannot locate the place of the fault directly from evaluation results of real-time monitoring and has low operation and maintenance efficiency.

SUMMARY

The present disclosure provides a method, an apparatus, and a system for locating an IPTV fault, aiming to implement IPTV fault locating and improve operation and maintenance efficiency.

A first aspect of the present disclosure provides a method for locating an Internet Protocol television IPTV fault, the method includes:

acquiring a upstream evaluation result, where the upstream evaluation result is obtained from a synchronized evaluation performed, according to a synchronization message, by an upstream monitoring point on a monitored IPTV video stream, the synchronization message includes synchronization packet information, an evaluation method, and an evaluation period, the synchronization packet information includes a synchronization identifier that uniquely identifies a synchronization packet, and the synchronization packet is a media packet selected from the IPTV video stream;

receiving an evaluation result report message sent by a downstream monitoring point, where the evaluation result report message includes a downstream evaluation result, an evaluation result identifier, and the synchronization packet information;

finding, according to the synchronization packet information and the evaluation result identifier in the evaluation result report message sent by the downstream monitoring point, the upstream evaluation result corresponding to the downstream evaluation result; and comparing the downstream evaluation result with the upstream evaluation result, and performing fault locating according to a result of the comparison. A second aspect of the present disclosure provides another method for locating an IPTV fault, the method includes:

receiving a synchronization message sent by an upstream monitoring point or a monitoring center, where the synchronization message includes synchronization packet information, an evaluation method, and an evaluation period, the synchronization packet information includes a synchronization identifier that uniquely identifies a synchronization packet, and the synchronization packet is a media packet selected from a monitored IPTV video stream;

performing a synchronized evaluation on the IPTV video stream according to the synchronization message to obtain a downstream evaluation result; and sending an evaluation result report message to the upstream monitoring point or the monitoring center, where the evaluation result report message includes the downstream evaluation result, an evaluation result identifier, and the synchronization packet information, so that the upstream monitoring point or the monitoring center finds, according to the synchronization packet information and the evaluation result identifier, an upstream evaluation result corresponding to the downstream evaluation result, compares the downstream evaluation result with the upstream evaluation result, and performs fault locating according to a result of the comparison. A third aspect of the present disclosure provides an apparatus for locating an IPTV fault, the apparatus includes:

a synchronization evaluator, configured to acquire a upstream evaluation result, where the upstream evaluation result is obtained from a synchronized evaluation performed, according to a synchronization message, by an upstream monitoring point on a monitored IPTV video stream, the synchronization message includes synchronization packet information, an evaluation method, and an evaluation period, the synchronization packet information includes a synchronization identifier that uniquely identifies a synchronization packet, and the synchronization packet is a media packet selected from the IPTV video stream;

an evaluation result receiver, configured to receive an evaluation result report message sent by a downstream monitoring point, where the evaluation result report message includes a downstream evaluation result, an evaluation result identifier, and the synchronization packet information;

an evaluation result querier, configured to find, according to the synchronization packet information and the evaluation result identifier in the evaluation result report message sent by the downstream monitoring point, the upstream evaluation result corresponding to the downstream evaluation result; and a fault locator, configured to compare the downstream evaluation result with the upstream evaluation result and perform fault locating according to a result of the comparison. A fourth aspect of the present disclosure provides another apparatus for locating an IPTV fault, the apparatus includes:

a synchronization message receiver, configured to receive a synchronization message sent by an upstream monitoring point or a monitoring center, where the synchronization message includes synchronization packet information, an evaluation method, and an evaluation period, the synchronization packet information includes a synchronization identifier that uniquely identifies a synchronization packet, and the synchronization packet is a media packet selected from a monitored IPTV video stream;

a synchronization evaluator, configured to perform a synchronized evaluation on the IPTV video stream according to the synchronization message and obtain a downstream evaluation result; and an evaluation result reporter, configured to send an evaluation result report message to the upstream monitoring point or the monitoring center, where the evaluation result report message includes the downstream evaluation result, an evaluation result identifier, and the synchronization packet information, so that the upstream monitoring point or the monitoring center finds, according to the synchronization packet information and the evaluation result identifier, an upstream evaluation result corresponding to the downstream evaluation result, compares the downstream evaluation result with the upstream evaluation result, and performs fault locating according to a result of the comparison. A fifth aspect of the present disclosure provides a system for locating an IPTV fault, including an evaluation locating apparatus which includes an apparatus according to the third aspect of the present disclosure and a downstream monitoring point which includes an apparatus according to the fourth aspect of the present disclosure.

According to a method, an apparatus, and a system for locating an IPTV fault provided by the present disclosure, it can be determined whether a fault exists in a region between every two monitoring points by comparing an upstream evaluation result of an upstream monitoring point and a downstream evaluation result of a downstream monitoring point, thereby implementing IPTV fault locating, saving costs of manpower and material resources, and improving efficiency in fault locating.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

Figure 1:
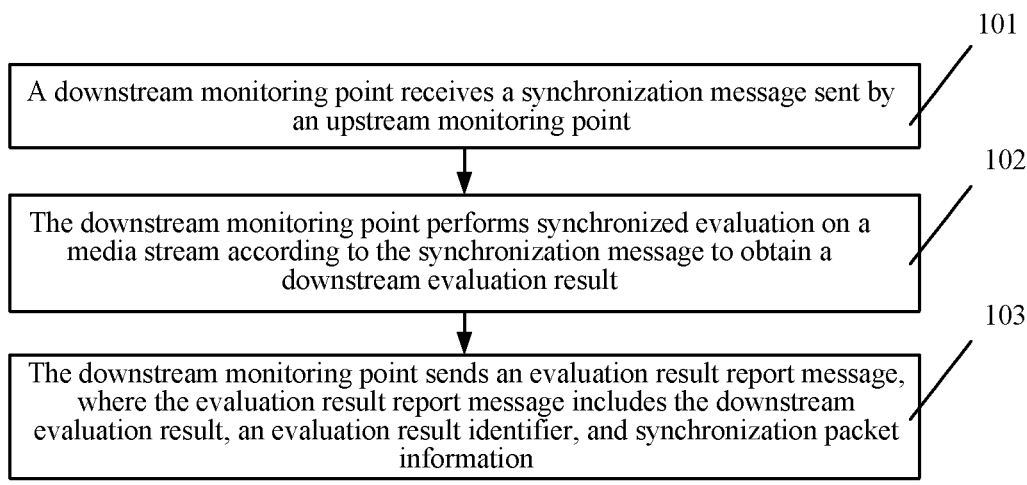
FIG. 1 is a schematic flowchart of an embodiment of a method for locating an IPTV fault according to the present disclosure.

To make the objectives, technical solutions, and advantages of the embodiments of the present disclosure more comprehensible, the following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Embodiment 1

A method in this embodiment may be executed by an upstream monitoring point in an IPTV video stream. Multiple monitoring points are arranged in a transmission path of the IPTV video stream, including an upstream monitoring point that is located in an upstream of the transmission path and a downstream monitoring point that is located in a downstream of the transmission path.

It should be noted that, in any embodiment of the present disclosure, "upstream" and "downstream" in the upstream monitoring point and the downstream monitoring point are relative concepts; that is, along the transmission path of the IPTV video stream, a monitoring point that the video stream flows through earlier is called an upstream monitoring point, and a monitoring point that the video stream flows through later is called a downstream monitoring point. Therefore, for the upstream, one of the monitoring points in the transmission path is a downstream monitoring point, and for the downstream, it is an upstream monitoring point.

However, an IPTV head-end monitoring point is the only monitoring point that generates a synchronization message (the synchronization message will be illustrated in detail later), where the IPTV head-end monitoring point is a monitoring point that the IPTV video stream flows through first, that is, a monitoring point closely adjacent to an IPTV head end in the transmission path of the IPTV video stream; and the IPTV head-end monitoring point is also called an upstream monitoring point, that is, the upstream monitoring point in this embodiment may include the IPTV head-end monitoring point.

After generating the synchronization message, the IPTV head-end monitoring point may send the synchronization message directly to all the other monitoring points in the transmission path of the IPTV video stream, and in this case, for the IPTV head-end monitoring point, all the other monitoring points are downstream monitoring points; or the IPTV head-end monitoring point may also forward the synchronization message to all the other monitoring points in the transmission path through a monitoring center; or the IPTV head-end monitoring point may also send the synchronization message to a closely adjacent downstream monitoring point, and then the synchronization message is transmitted by the closely adjacent downstream monitoring point to a next monitoring point thereof so as to be transmitted from one monitoring point to another monitoring point successively.

Accordingly, after receiving the synchronization message, each monitoring point in the transmission path of the IPTV video stream may return a synchronization response message to the IPTV head-end monitoring point, where the synchronization response message includes initial evaluation packet information and the synchronization packet information. The IPTV head-end monitoring point may compare the synchronization packet information and the initial evaluation packet information with local synchronization packet information and initial evaluation packet information respectively to determine whether they are consistent; and when either the synchronization packet information or the initial evaluation packet information is inconsistent, send a new synchronization message to a downstream monitoring point, where the new synchronization message includes a new evaluation method.

The synchronization message may be sent periodically to ensure consistency of a real-time evaluation among each monitoring point. The synchronization message may include the synchronization packet information, an evaluation method, and an evaluation period. The synchronization packet information may include a synchronization identifier that uniquely identifies a synchronization packet, and based on this, the synchronization packet information may further include a synchronization packet, where the synchronization packet is a media packet selected by an upstream monitoring point from a monitored IPTV video stream.

For example, for a media packet of a video, where the media packet is borne in an RTP manner, an RTP sequence number may be used as the synchronization identifier. For a media packet that is borne in a non-RTP manner but has a field that has a similar function to the RTP sequence number, the field may be used as the synchronization identifier. For example, for a media packet transmitted directly in a TCP manner, a sequence number of a TCP packet may be used as the synchronization identifier. For a media packet that is borne in a non-RTP manner and does not have a related field that has a similar function to the RTP sequence number exists, the synchronization packet may be determined according to characteristics of the whole media packet or characteristics of encapsulated media content. For example, a CRC check value or a HASH value of the packet and so on may be calculated, and the synchronization packet is specified by using the value obtained from calculation, or the synchronization packet is specified according to a clock value (if any) and so on encapsulated in the media packet.

The evaluation method is an evaluation method based on the synchronization packet, may be determined according to an evaluation algorithm in use, and aims to tell a downstream monitoring point how to perform an evaluation on the IPTV video stream. For example, the evaluation method may be as follows: Taking the synchronization packet as a start, the evaluation begins at a key frame that is met first after a preceding evaluation period ends, and the evaluation result is taken as a first evaluation result of this synchronization.

The evaluation algorithm needs to give an overall evaluation result value within an evaluation period. That is, one evaluation period corresponds to one evaluation result, each evaluation result may be numbered, and the number is taken as an evaluation result identifier. For example, the evaluation period may be one evaluation every 10 s.

According to this embodiment, the upstream monitoring point sends the synchronization message to a downstream monitoring point, so that the downstream monitoring point performs synchronized evaluation on the IPTV video stream according to the synchronization identifier. That is, the IPTV video stream may include many video packets, and the downstream monitoring point and the upstream monitoring point must perform an evaluation on a same packet of the IPTV video stream, so that a downstream evaluation result obtained by the downstream monitoring point may be subsequently compared with an upstream evaluation result to determine a location of an IPTV fault.

When performing the evaluation, the downstream monitoring point performs the evaluation on the IPTV video stream according to the synchronization message. For example, the synchronization identifier in the synchronization packet information is "a packet whose RTP sequence number is 3 in a first RTP sequence number period", the evaluation method is "taking the synchronization packet as a start, the evaluation begins at a key frame that is met first after a preceding evaluation period ends, the evaluation result is taken as a first evaluation result of this synchronization", and the evaluation period is "10 s". Based on this, the evaluation manner that the downstream monitoring point takes is as follows: Taking the packet whose RTP sequence number is 3 in the first RTP sequence number period as the start, the evaluation begins at the key frame that is met first after the preceding evaluation period ends, the evaluation result obtained after an evaluation of 10 s is taken as the first evaluation result of this synchronization, and the evaluation result identifier is set to "No. 1 evaluation result". The downstream monitoring point may send an evaluation result report message, where the evaluation result report message includes the obtained downstream evaluation result, and also includes the evaluation result identifier and the synchronization packet information that the downstream monitoring point follows when performing the evaluation.

The preceding evaluation result report message may be sent to the upstream monitoring point or the monitoring center. That is, processing that the downstream evaluation result and the upstream evaluation result are compared may be performed by the upstream monitoring point or the monitoring center. When it is performed by the upstream monitoring point, the upstream monitoring point may find, according to the synchronization packet information and the evaluation result identifier, the upstream evaluation result corresponding to the downstream evaluation result, compare them with each other, and perform fault locating according to a result of the comparison. In this case, the evaluation results, which are made by the upstream monitoring point and the downstream monitoring point for the same packet of the IPTV video stream, are compared. Therefore, they have comparability.

For example, if no deterioration exists in the upstream evaluation result of the upstream monitoring point or a deterioration degree of the upstream evaluation result is lower than that of the downstream evaluation result, it can be determined that a fault occurs between the upstream monitoring point and the downstream monitoring point, thereby implementing IPTV fault locating. Specifically, when comparison of the evaluation results is performed, video quality evaluation values in the evaluation results are compared; the "deterioration" is determined by the upstream monitoring point itself. For a specific example, if a certain evaluation method is used to evaluate the IPTV video stream, assume that an ideal video quality evaluation value of the IPTV video stream is 100, and the upstream monitoring point obtains a video quality evaluation value of 80 after evaluating the IPTV video stream by using this evaluation method, the upstream monitoring point itself may obtain that deterioration exists in the evaluation result of the IPTV video stream (80 is lower than the ideal value of 100).

When the downstream monitoring point performs the evaluation, a method is to the same as the preceding principle. In addition, the downstream monitoring point itself may set a threshold for the video quality evaluation value, assuming the threshold is 60. If the video quality evaluation value obtained from the evaluation is 70, which is higher than the threshold, this indicates that no fault occurs in the IPTV video stream; if the video quality evaluation value obtained from the evaluation is 50, which is lower than the threshold, this indicates that a fault occurs in the IPTV video stream. When the upstream evaluation result is compared with the downstream evaluation result, it is their video quality evaluation values that are compared. Assume that the video quality evaluation value obtained from an upstream evaluation is 80 score, and the video quality evaluation value obtained from a downstream evaluation is 70 score, this indicates that the deterioration degree of the upstream evaluation result is lower than that of the downstream evaluation result.

The synchronization message in this embodiment may be sent by the upstream monitoring point to an adjacent downstream monitoring point, and a fault between the two adjacent monitoring points may be located accordingly. The synchronization message may also be sent by the upstream monitoring point to a non-adjacent downstream monitoring point, and a fault between the two non-adjacent monitoring points may be located accordingly. That is, synchronous monitoring is not limited to two adjacent monitoring points, and the upstream monitoring point may send the synchronization message to any monitoring point in the downstream.

In addition, according to this embodiment and subsequent embodiments, assume that an upstream monitoring point A sends a synchronization message to a downstream monitoring point B to perform synchronized evaluation; to distinguish between evaluation results of the preceding two monitoring points, an evaluation result obtained by the upstream monitoring point A is called an upstream evaluation result, and an evaluation result obtained by the downstream monitoring point B is called a downstream evaluation result.

According to the method for locating an IPTV fault in this embodiment, it can be determined whether a fault exists in a region between an upstream monitoring point and a downstream monitoring point by comparing an upstream evaluation result with a downstream evaluation result of a same media packet, thereby implementing IPTV fault locating.

Embodiment 2

FIG. 1 is a schematic flowchart of an embodiment of a method for locating an IPTV fault according to the present disclosure. The method may be executed by a downstream monitoring point. As shown in FIG. 1, the method may include the following steps:

Step 101: The downstream monitoring point receives a synchronization message sent by an upstream monitoring point.

The synchronization message may include synchronization packet information, an evaluation method, and an evaluation period, the synchronization packet information includes a synchronization identifier that uniquely identifies a synchronization packet, and the synchronization packet is a media packet selected by the upstream monitoring point from a monitored IPTV video stream.

For explanations on the synchronization packet information, the evaluation method, and the evaluation period, reference may be made to the description in Embodiment 1.

Step 102: The downstream monitoring point performs synchronized evaluation on the IPTV media stream according to the synchronization message to obtain a downstream evaluation result.

The downstream evaluation result, which is obtained from the evaluation performed, according to the synchronization message, by the downstream monitoring point on the IPTV video stream, takes the synchronization packet as a start, and the evaluation result has an evaluation result identifier that uniquely identifies the result. Each evaluation result corresponds to one evaluation period.

In addition to a video quality evaluation value, the evaluation result may further include information about packets within a corresponding evaluation range, for example, packet attribute values of the packets within the range, which may be packet attribute values of an initial packet and a final packet within the range or an attribute value, and a delay of each packet within the range, where the evaluation range refers to a range from the initial evaluation packet to the final evaluation packet of the evaluation. With a selection manner similar to the synchronization identifier of the synchronization packet, the attribute value of a packet may be used to uniquely identify the packet. The packet attribute value may be used by the upstream monitoring point or a monitoring center to compare information of packets, for example, packet attribute values, within the evaluation range of the upstream monitoring point with that of the downstream monitoring point, so that it can be further determined whether synchronization is really implemented between the upstream monitoring point and the downstream monitoring point.

Furthermore, to obtain a reason why a video deteriorates, the evaluation result may also include a corresponding application layer indicator, for example, a damage rate of an I frame or a P frame.

Step 103: The downstream monitoring point sends an evaluation result report message, where the evaluation result report message includes the downstream evaluation result, an evaluation result identifier, and the synchronization packet information.

The evaluation result report message may be sent to the upstream monitoring point or the monitoring center, and the upstream monitoring point or the monitoring center compares the downstream evaluation result with an upstream evaluation result.

For example, the upstream monitoring point may find, according to the synchronization packet information and the evaluation result identifier, the upstream evaluation result corresponding to the downstream evaluation result, and compare them with each other. In this case, the evaluation results, which are made by the upstream monitoring point and the downstream monitoring point for a same part of the IPTV video stream, are compared and have comparability. If no deterioration exists in the upstream evaluation result or a deterioration degree of the upstream evaluation result is lower than that of the downstream evaluation result, it is determined that a fault occurs between the upstream monitoring point and the downstream monitoring point.

According to the method for locating an IPTV fault in this embodiment, it can be determined whether a fault exists in a region between an upstream monitoring point and a downstream monitoring point by comparing an upstream evaluation result with a downstream evaluation result of a same media packet, thereby implementing IPTV fault locating.

Embodiment 3

Figure 2:
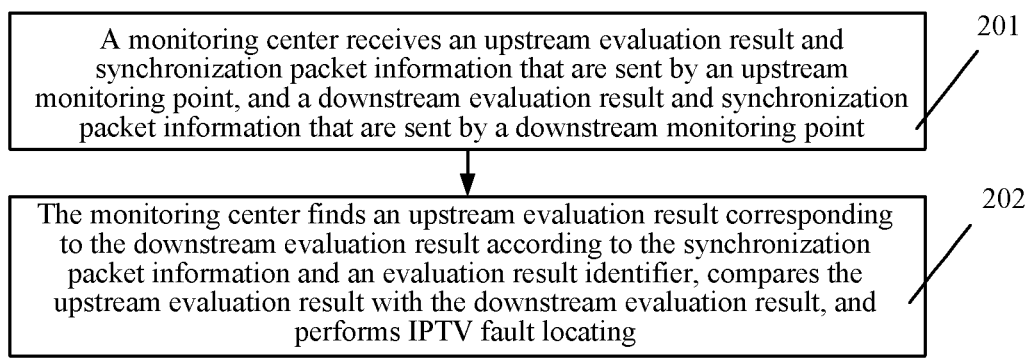
FIG. 2 is a schematic flowchart of another embodiment of a method for locating an IPTV fault according to the present disclosure.

FIG. 2 is a schematic flowchart of another embodiment of a method for locating an IPTV fault according to the present disclosure. The method may be executed by a monitoring center. As shown in FIG. 2, the method may include the following steps:

Step 201: The monitoring center receives an upstream evaluation result and synchronization packet information that are sent by an upstream monitoring point, and receives an evaluation result report message sent by a downstream monitoring point, where the evaluation result report message includes a downstream evaluation result, an evaluation result identifier, and the synchronization packet information.

After evaluating a monitored IPTV video stream, the upstream monitoring point sends the obtained upstream evaluation results to the monitoring center and sends together the synchronization packet information to the monitoring center, where no limitation is set to an order in which the synchronization packet information and the upstream evaluation results are sent to the monitoring center. For example, the synchronization packet information may be sent to the monitoring center first, and then the upstream evaluation results are sent, or they are sent simultaneously. The synchronization packet information includes a synchronization identifier that uniquely identifies a synchronization packet, where the synchronization packet is selected by the upstream monitoring point from media packets of the monitored IPTV video stream, and a synchronization message may also include an evaluation method and an evaluation period.

In addition, after receiving the synchronization message sent by the upstream monitoring point, the downstream monitoring point obtains a downstream evaluation result after performing, according to the synchronization message, synchronized evaluation on the IPTV video stream. The downstream monitoring point may send the evaluation result report message to the monitoring center, where the evaluation result report message carries the downstream evaluation result, the evaluation result identifier that uniquely identifies the downstream evaluation result, and the synchronization packet information.

Step 202: The monitoring center compares the upstream evaluation result with the downstream evaluation result to perform IPTV fault locating.

The monitoring center may find, according to the synchronization packet information and the evaluation result identifier in the evaluation result report message sent by the downstream monitoring point, the upstream evaluation result corresponding to the downstream evaluation result; and compare the upstream evaluation result with the downstream evaluation result. If no deterioration exists in the upstream evaluation result or a deterioration degree of the upstream evaluation result is lower than that of the downstream evaluation result, it can be determined that a fault occurs between the upstream monitoring point and the downstream monitoring point.

According to the method for locating an IPTV fault in this embodiment, it can be determined whether a fault exists in a region between an upstream monitoring point and a downstream monitoring point by comparing an upstream evaluation result with a downstream evaluation result of a same media packet, thereby implementing IPTV fault locating.

Embodiment 4

Figure 3:
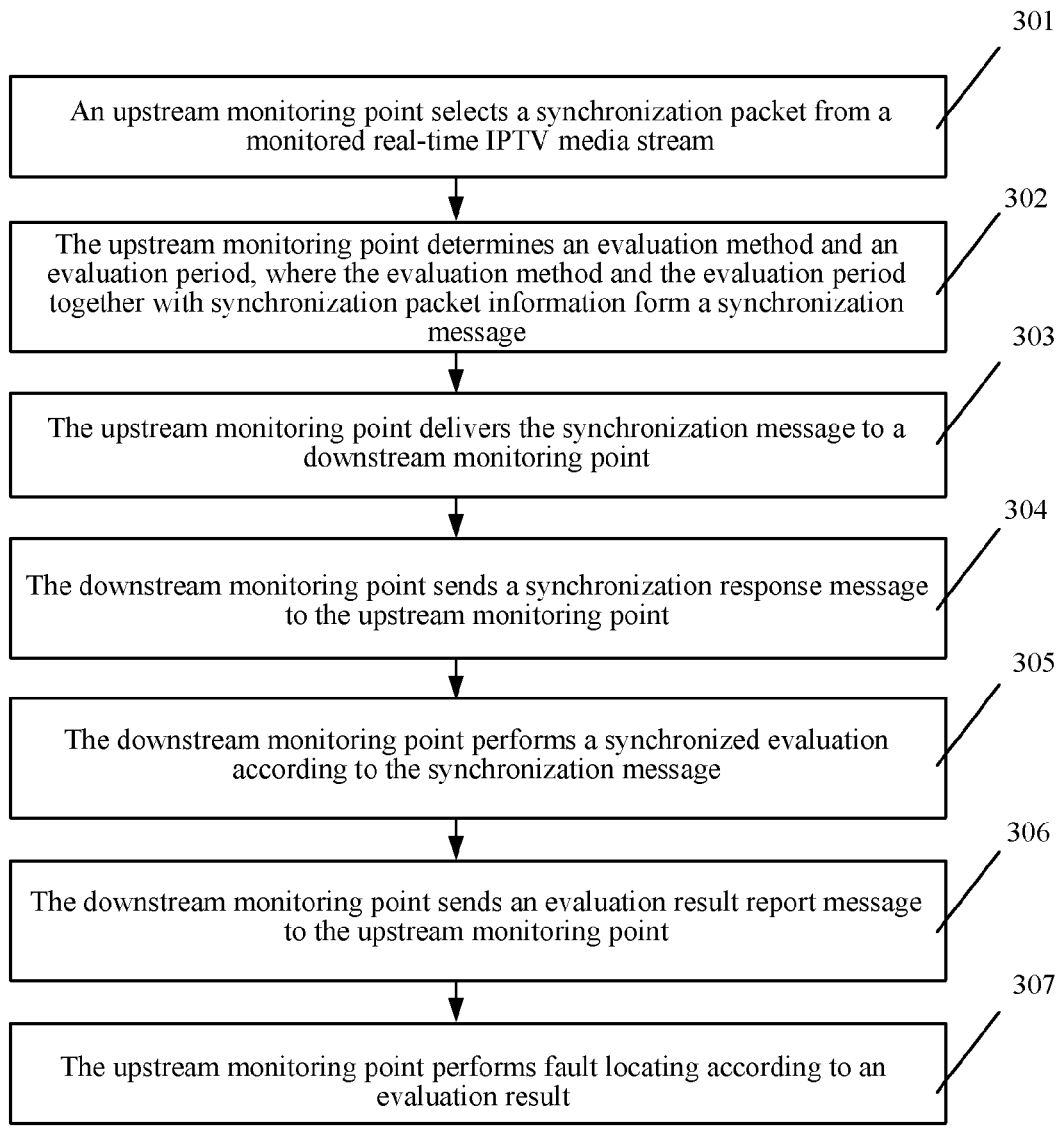
FIG. 3 is a schematic flowchart of still another embodiment of a method for locating an IPTV fault according to the present disclosure.

FIG. 3 is a schematic flowchart of still another embodiment of a method for locating an IPTV fault according to the present disclosure. By taking the fact that an upstream monitoring point, and a downstream monitoring point in a transmission path of an IPTV video stream, and a monitoring center are included as an example, this embodiment gives a more detailed description about the method for locating an IPTV fault in the present disclosure. The method for locating an IPTV fault in this embodiment is a distributed locating method and IPTV fault locating is completed by the upstream monitoring point. As shown in FIG. 3, the method may include the following steps:

Step 301: The upstream monitoring point selects a synchronization packet from a monitored IPTV video stream.

The synchronization packet may be selected by the upstream monitoring point from the IPTV video stream. It needs to be followed that the selected synchronization packet has uniqueness in the IPTV video stream during selection of the synchronization packet.

For example, different manners for bearing a video are taken as examples to describe manners for selecting the synchronization packet in this step: If the IPTV video stream is borne in a Real-time Transport Protocol (RTP) manner, an RTP sequence number may be selected as a selection standard, different packets in the video stream have different RTP sequence numbers, an RTP packet may be selected as the synchronization packet from the video stream, the RTP sequence number is taken as a synchronization identifier of the synchronization packet, and the synchronization identifier is used to uniquely identify the synchronization packet;

if the video is borne by a non-RTP media packet but the non-RTP media packet has a field that has similar function to the RTP sequence number, the field may be taken as a selection standard, for example, for a media packet transmitted directly in a TCP manner, a sequence number (sequence number) of a TCP packet may be used to specify the synchronization packet and the sequence number is taken as the synchronization identifier; and if the video is borne in a non-RTP media packet and the media packet does not have a related field that has a similar function to the RTP sequence number, the synchronization packet may be determined according to characteristics of the whole media packet or characteristics of encapsulated media content, for example, a cyclic redundancy check code (Cyclic Redundancy Check, CRC for short) check value or a Hash value (or called HASH value) and so on of the media packet may be calculated, the synchronization packet is specified by using the value obtained from the calculation, and the value obtained from the calculation is taken as the synchronization identifier, or the synchronization packet is specified according to a clock value (if any) and so on encapsulated in the media packet.

The manners for selecting the synchronization packet are flexible and various, as long as the media packet selected from the IPTV video stream can be uniquely identified. The synchronization packet and the synchronization identifier together form synchronization packet information, or the synchronization packet information may also include only the synchronization identifier as long as the downstream monitoring point can find, according to the synchronization identifier, a corresponding synchronization packet in the IPTV video stream.

Step 302: The upstream monitoring point determines an evaluation method and an evaluation period, where the evaluation method and the evaluation period together with the synchronization packet information form a synchronization message.

The "evaluation method" refers to an evaluation method based on the synchronization packet and is determined according to an evaluation algorithm in use. For example, if a mean opinion score for video (MOSV) algorithm that takes a frame as a scoring granularity is used for evaluation, in combination with the evaluation period (assume that the evaluation period is 10 s), the evaluation method may be specified as follows: Taking the synchronization packet as a start, the evaluation begins at a key frame that is met first after a preceding evaluation period ends, and the evaluation result of a first evaluation period is taken as a first evaluation result of this synchronization. That is, one evaluation result corresponds to one evaluation period and is an overall evaluation result value within one evaluation period instead of multiple evaluation result values given according to its evaluation granularity (such as a frame and a group of pictures (GOP)).

The "evaluation period" is also determined according to the evaluation algorithm. For example, time is taken as a unit for setting the evaluation period, or a GOP is taken as a unit for setting the evaluation period.

The synchronization packet information in step 301 and the evaluation method and the evaluation period in this step together form the synchronization message, where the synchronization message enables the downstream monitoring point and the upstream monitoring point to select a same evaluation object for performing an evaluation, thereby implementing synchronized evaluation between the downstream monitoring point and the upstream monitoring point.

Step 303: The upstream monitoring point sends the synchronization message to the downstream monitoring point.

Figure 4:
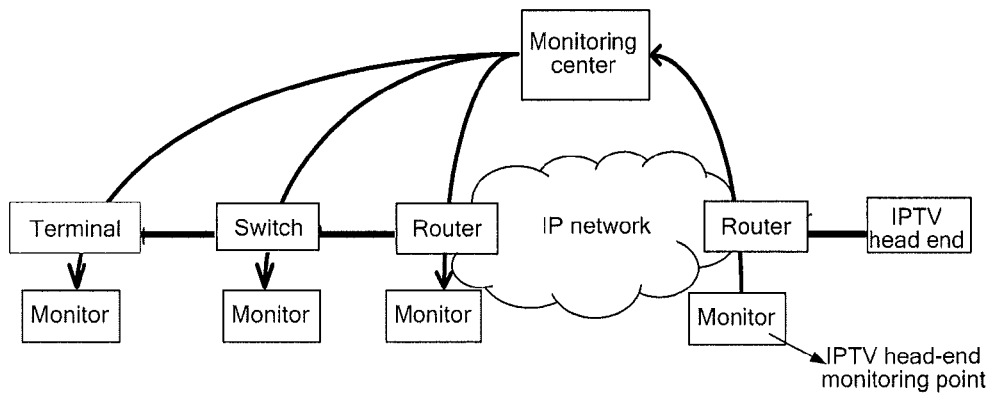
FIG. 4 is a schematic diagram of a manner for sending a synchronization message in an embodiment of a method for locating an IPTV fault according to the present disclosure.
Figure 5:
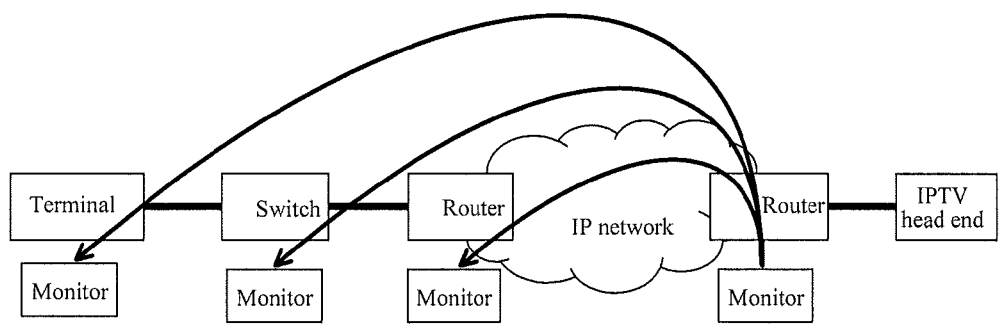
FIG. 5 is a schematic diagram of another manner for sending a synchronization message in an embodiment of a method for locating an IPTV fault according to the present disclosure.

The synchronization message may be sent in two manners as shown in FIG. 4 or FIG. 5. FIG. 4 is a schematic diagram of a manner for sending a synchronization message in an embodiment of a method for locating an IPTV fault according to the present disclosure. FIG. 5 is a schematic diagram of another manner for sending a synchronization message in an embodiment of a method for locating an IPTV fault according to the present disclosure.

For example, as shown in FIG. 4, the upstream monitoring point may send the synchronization message to the monitoring center, and the monitoring center sends the synchronization message to other downstream monitoring points, so that the downstream monitoring points perform synchronized evaluation according to the synchronization message.

Alternatively, for example, as shown in FIG. 5, the upstream monitoring point may send the synchronization message directly to the downstream monitoring point. According to this manner, the upstream monitoring point needs to know in advance which monitoring points are in a downstream, and this may be implemented in a manual configuration manner and may also be acquired from the monitoring center.

In this embodiment, the synchronization message needs to be sent periodically to ensure consistency of a real-time evaluation among each monitoring point. A period for sending the synchronization message may be determined according to characteristics of the evaluation algorithm and practical conditions and may be dynamically adjusted. For example, the period for synchronization may be set to synchronization every 30 minutes.

Step 304: The downstream monitoring point sends a synchronization response message to the upstream monitoring point.

After receiving the synchronization message of the upstream monitoring point, the downstream monitoring point needs to send the synchronization response message to the upstream monitoring point, where the synchronization response message should include at least the synchronization packet information and initial evaluation packet information, and the initial evaluation packet information includes at least a packet identifier of an initial evaluation packet, and the packet identifier is used to identify from which packet the downstream monitoring point starts to evaluate. The downstream monitoring point can acquire the initial evaluation packet from the IPTV video stream according to the synchronization packet information, the evaluation method, and the evaluation period. For example, as described in Embodiment 1, the evaluation method is that taking the synchronization packet as a start, the evaluation begins at a key frame that is met first after a preceding evaluation period ends, and based on this, the downstream monitoring point can acquire the first key frame, where the key fame is the initial evaluation packet, and the packet identifier of the synchronization packet is determined in a way similar to that of determining the synchronization identifier of the synchronization packet.

After acquiring the initial evaluation packet information, the downstream monitoring point may send the synchronization response message to an IPTV head-end monitoring point of the upstream monitoring point, so that the IPTV head-end monitoring point determines, according to the synchronization response message, whether the downstream monitoring point is really synchronized.

Figure 8:
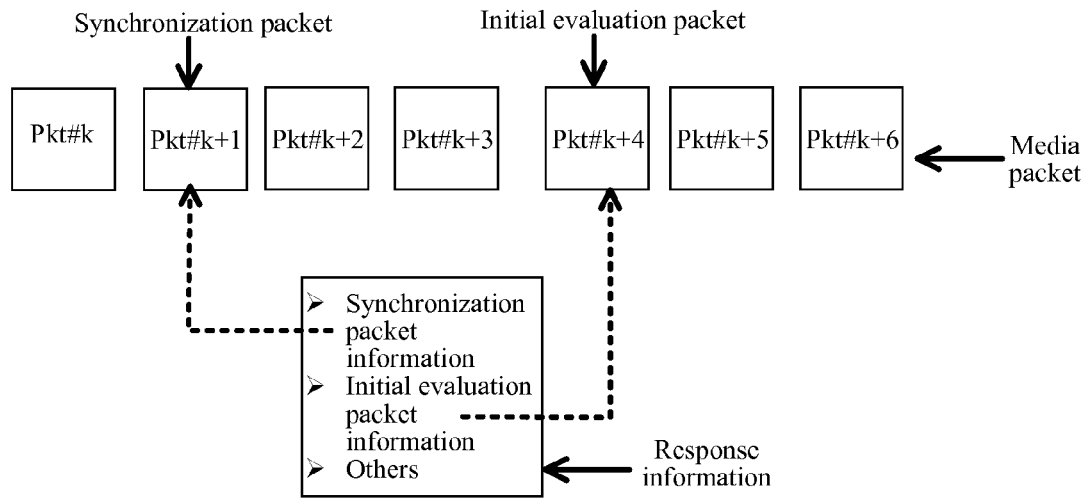
FIG. 8 is a schematic diagram of a synchronization response in an embodiment of a method for locating an IPTV fault according to the present disclosure.

FIG. 8 is a schematic diagram of a synchronization response in an embodiment of a method for locating an IPTV fault according to the present disclosure. As shown in FIG. 8, the synchronization packet information in the synchronization response is information about a synchronization packet indicated by a dashed line, for example, the information may be a synchronization identifier of the synchronization packet, and the synchronization packet is a packet with an identifier of #k+1; the initial evaluation packet information in the synchronization response is information of an initial evaluation packet indicated by a dashed line, for example, the information may be a packet identifier of the initial evaluation packet, and the initial evaluation packet is a packet with an identifier of #k+6. The evaluation method in step 302 is still taken as an example, and the initial evaluation packet is a packet where the key frame, which is met first after the synchronization packet, is located, and is also equivalent to an initial evaluation packet in an evaluation result #1 of FIG. 6. The initial evaluation packet information may be used to confirm whether synchronization is really implemented. For example, both the upstream monitoring point and the downstream monitoring point perform an evaluation on video quality according to a same synchronization message, if a synchronization packet and an initial evaluation packet of the upstream monitoring point are consistent with a synchronization packet and an initial evaluation packet of the downstream monitoring point respectively, synchronization is implemented between them; and if either the synchronization packets or the initial evaluation packets are inconsistent, or the response information is not received before a set time expires, synchronization may be performed again.

For example, the upstream monitoring point may compare the received synchronization packet information and initial evaluation packet information of the downstream monitoring point with local synchronization packet information and initial evaluation packet information (that is, synchronization packet information and initial evaluation packet information of the upstream monitoring point) synchronization packet information and initial evaluation packet information respectively, to determine whether they are consistent; if yes, this indicates that synchronization has already been implemented between the upstream monitoring point and the downstream monitoring point, and their evaluation results may be compared subsequently; if not, this indicates that synchronization has not been implemented between the upstream monitoring point and the downstream monitoring point, a new synchronization message may be sent to the downstream monitoring point, where the new synchronization message includes a new evaluation method.

A corresponding change should be made to the evaluation method in the new synchronization message resent by the upstream monitoring point, thereby preventing an error that actual evaluations are not synchronized although a synchronization process is complete from occurring. For example, the evaluation method in step 302 is taken as an example; in this case, the "preceding evaluation period" should not be taken as a reference, instead a standard that can complete synchronization should be chosen, and the evaluation method may be specified as follows: Taking the synchronization packet as a start, the evaluation begins at a key frame that is met first, and the evaluation result is taken as a first evaluation result of this synchronization.

In addition, the synchronization response message may be sent by the downstream monitoring point directly to the upstream monitoring point or may be forwarded by the monitoring center. The synchronization response message may also be sent by the downstream monitoring point to the monitoring center. In addition, upstream evaluation results, which are sent by the upstream monitoring point and received by the monitoring center, also include the initial evaluation packet information. The monitoring center may compare the synchronization packet information and the initial evaluation packet information of the upstream monitoring point with that of the downstream monitoring point respectively to determine whether they are consistent, and instruct, when they are inconsistent, the upstream monitoring point to resend the new synchronization message, where the new synchronization message includes the new evaluation method.

The IPTV head-end monitoring point of the upstream monitoring point executes processing of the synchronization response message. The IPTV head-end monitoring point sends the new synchronization message to one of the downstream monitoring points, aiming to enable an out-of-synchronization monitoring point to keep synchronized with other monitoring points, and therefore, the synchronization message for the other monitoring points does not require a change, and the new synchronization message needs to be sent only to the out-of-synchronization monitoring point.

Step 305: The downstream monitoring point performs the synchronized evaluation according to the synchronization message.

Before receiving the synchronization message sent by the upstream monitoring point, the downstream monitoring point may perform an evaluation on the video quality according to its default evaluation rule. After receiving the synchronization message, the downstream monitoring point will perform the synchronized evaluation with the upstream monitoring point according to the synchronization message and perform the evaluation on the video quality by using the evaluation method that is determined according to the synchronization message.

For example, the evaluation method specified in step 302 is "taking the synchronization packet as a start, evaluation begins at a key frame that is met first after a preceding evaluation period ends, and an evaluation result of a first evaluation period is taken as a first evaluation result of this synchronization", and base on this, the downstream monitoring point may find the corresponding synchronization packet according to the synchronization identifier, take the synchronization packet as the start, start evaluation at the key frame that is met first (a packet where this frame is located may be called the initial evaluation packet), obtain a corresponding evaluation result after each evaluation period ends, and number the evaluation result, where the evaluation result may be called a downstream evaluation result, and a number of the evaluation result may be called an evaluation result identifier that is used to uniquely determine the evaluation result.

Figure 6:
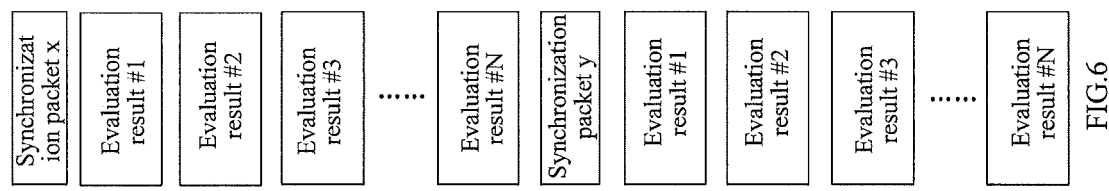
FIG. 6 is a schematic diagram of evaluation result distribution in an embodiment of a method for locating an IPTV fault according to the present disclosure.

Refer to FIG. 6. FIG. 6 is a schematic diagram of evaluation result distribution in an embodiment of a method for locating an IPTV fault according to the present disclosure. As the synchronization message is sent periodically, a "synchronization packet X" is taken as a start, it is an evaluation process that includes "evaluation results #1 to #N", and this evaluation process corresponds to synchronized evaluation performed according to a synchronization message that includes a synchronization packet X; a "synchronization packet Y" is taken as a start, it is another evaluation process that includes "evaluation results #1 to #N", and this evaluation process corresponds to synchronized evaluation performed according to a synchronization message that includes the synchronization packet Y. Each evaluation result corresponds to an overall evaluation result value within an evaluation period for the IPTV video stream; that is, evaluations for N evaluation periods are performed in each evaluation process.

Figure 7:
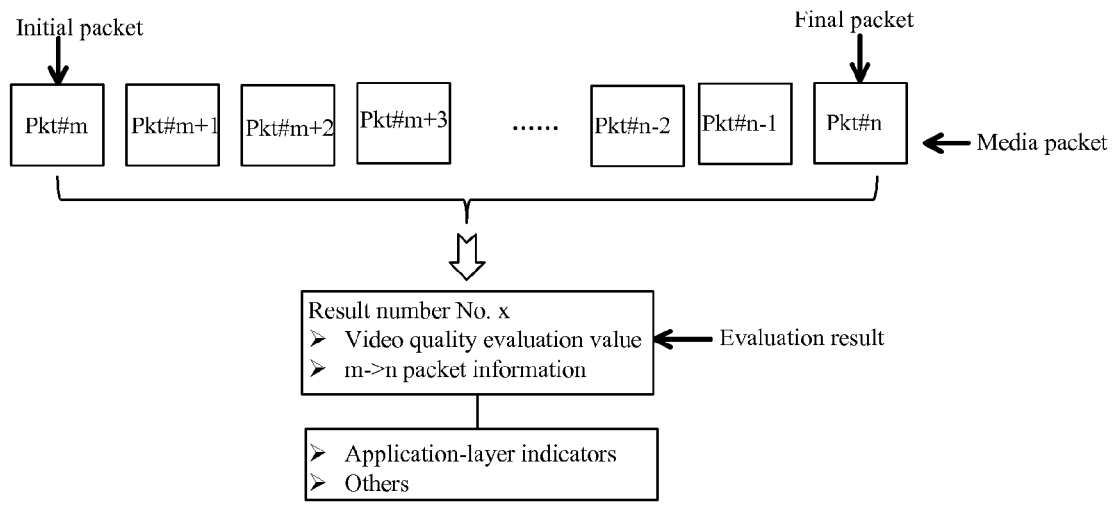
FIG. 7 is a schematic diagram of an evaluation result in an embodiment of a method for locating an IPTV fault according to the present disclosure.

Refer to FIG. 7. FIG. 7 is a schematic diagram of an evaluation result in an embodiment of a method for locating an IPTV fault according to the present disclosure. In addition to a video quality evaluation value, the evaluation result may further include information about packets (such as an attribute value and a delay of each packet) within a corresponding evaluation range to implement fault locating. The evaluation range refers to a packet range formed by an initial evaluation packet of evaluation and a final evaluation packet of the evaluation, similar to a range formed by the initial evaluation packet and the final evaluation packet in the evaluation result #1 of FIG. 6, or a range formed by the initial evaluation packet and the final evaluation packet in an evaluation result #N of FIG. 6, and so on; that is, one evaluation range corresponds to one evaluation result. The evaluation result is an overall evaluation result value obtained from an evaluation performed on all packets within the evaluation range.

Packet (pkt) information shown in FIG. 7 refers to the information about the packets within the evaluation range from the initial evaluation packet to the final evaluation packet, and may include packet attribute values, where each packet attribute value is used to uniquely identify a packet, for example, the packet attribute value may be a packet number (such as #m and #n in FIG. 7). The packet attribute value is selected in a manner similar to that of selecting the synchronization identifier of the synchronization packet, and as long as it can uniquely identify a packet, a packet attribute value of the initial evaluation packet may be taken as an identifier of the initial evaluation packet. In addition, the packet information may further include network-layer indicators (such as packet loss rate, delay, and jitter) and so on corresponding to the evaluation range. Furthermore, to obtain a reason why a video deteriorates, the evaluation result may further include application-layer indicators corresponding to the evaluation result, where the application-layer indicators may be evaluation parameters corresponding to the video quality evaluation value, such as damage rate of an I frame, damage rate of a P frame, and damage transmission rate.

Step 306: The downstream monitoring point sends an evaluation result report message to the upstream monitoring point.

Figure 9:
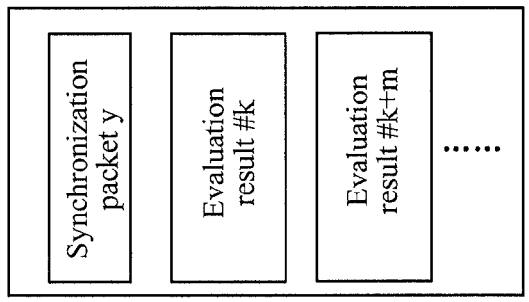
FIG. 9 is a schematic diagram of an evaluation result report message in an embodiment of a method for locating an IPTV fault according to the present disclosure.

After completing evaluation on the IPTV video stream, the downstream monitoring point may send the evaluation result report message to the upstream monitoring point, where the evaluation result report message may include the synchronization packet information, the downstream evaluation result, and the evaluation result identifier. FIG. 9 is a schematic diagram of an evaluation result report message in an embodiment of a method for locating an IPTV fault according to the present disclosure. As shown in FIG. 9, one evaluation result report message may include only one evaluation result and may also include multiple evaluation results simultaneously. The evaluation result report message includes a synchronization packet Y, a downstream evaluation result #k, and an evaluation result identifier (such as #k or #k+m).

In this step, when discovering that the video quality evaluation value in the downstream evaluation result that it obtains is lower than a set threshold and fault locating needs to be activated, the downstream monitoring point may bear the downstream evaluation result with the video quality evaluation value lower than the threshold, the evaluation result identifier, and the synchronization packet in the evaluation result report message and send the message to the upstream monitoring point. It should be noted that, according to the distributed locating method in this embodiment, the downstream monitoring point sends the evaluation result report message to the upstream monitoring point only when the video quality evaluation value in the downstream evaluation result is lower than the set threshold, which indicates that a fault occurs in the IPTV video stream; if the video quality evaluation value is not lower than the set threshold, the evaluation result report message is not sent.

Figure 10:
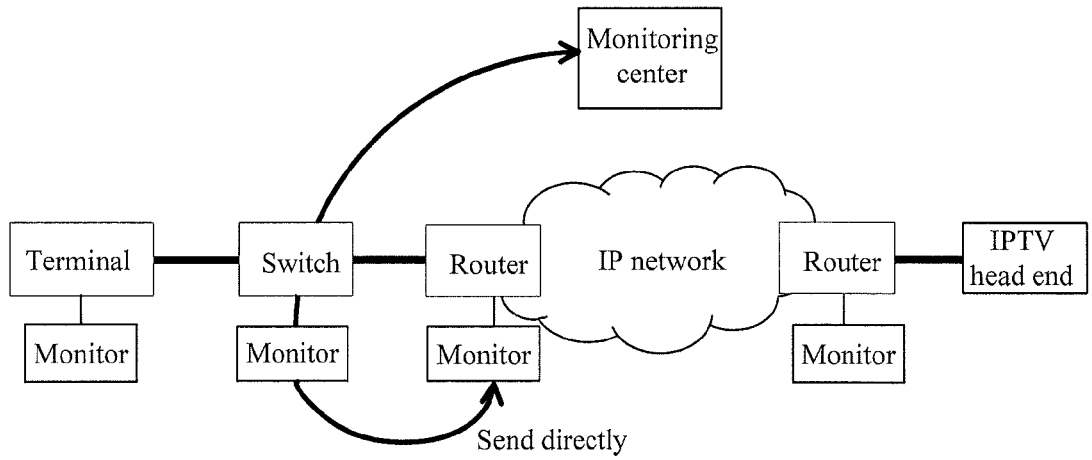
FIG. 10 is a schematic diagram of a manner for sending an evaluation result report message in an embodiment of a method for locating an IPTV fault according to the present disclosure.
Figure 11:
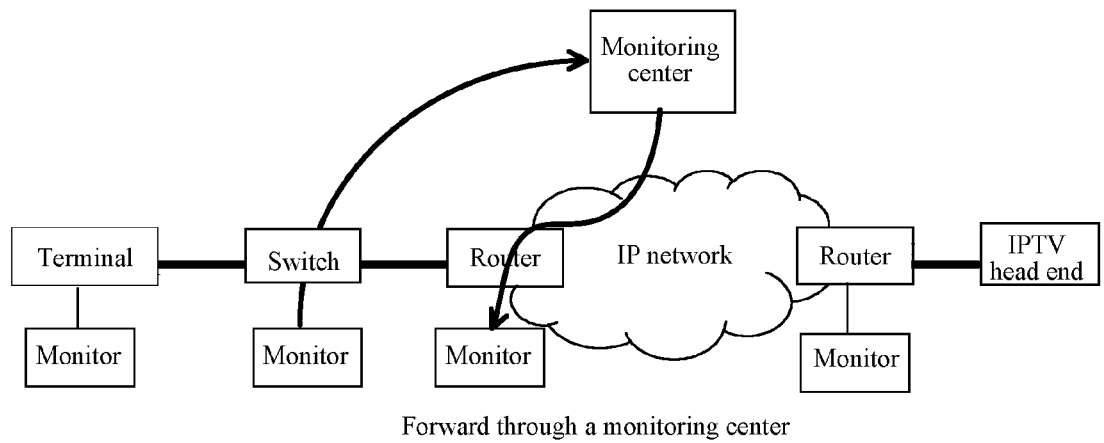
FIG. 11 is a schematic diagram of another manner for sending an evaluation result report message in an embodiment of a method for locating an IPTV fault according to the present disclosure.

When the evaluation result report message is sent to the upstream monitoring point, the manner shown in FIG. 10 or FIG. 11 may be used. FIG. 10 is a schematic diagram of a manner for sending an evaluation result report message in an embodiment of a method for locating an IPTV fault according to the present disclosure. FIG. 11 is a schematic diagram of another manner for sending an evaluation result report message in an embodiment of a method for locating an IPTV fault according to the present disclosure. As shown in FIG. 10, the downstream monitoring point may send the evaluation result report message directly to the upstream monitoring point and may further notify the monitoring center while sending the evaluation result report message to the upstream monitoring point. The aim of notifying the monitoring center is that the monitoring center may directly decide, when the upstream monitoring point does not respond before a set time expires, that a fault exists in a region between the upstream monitoring point and the downstream monitoring point. Alternatively, as shown in FIG. 11, the downstream monitoring point may forward the evaluation result report message through the monitoring center.

Step 307: The upstream monitoring point performs fault locating according to the evaluation result.

Figure 12:
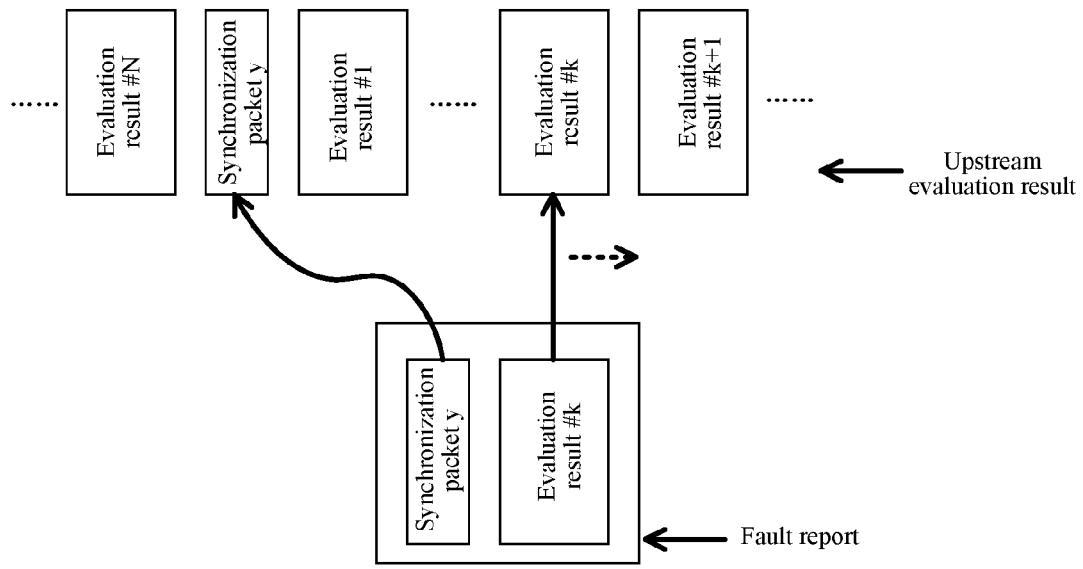
FIG. 12 is a schematic diagram of comparison of evaluation results in an embodiment of a method for locating an IPTV fault according to the present disclosure.

The upstream monitoring point may find a corresponding local evaluation result according to the synchronization packet and the evaluation result identifier in the evaluation result report message in step 306. Refer to FIG. 12. FIG. 12 is a schematic diagram of comparison of evaluation results in an embodiment of a method for locating an IPTV fault according to the present disclosure. The upstream monitoring point finds a synchronization packet Y in a local evaluation process according to the synchronization packet Y in the evaluation result report message, and finds, according to an evaluation result identifier #k, an evaluation result #k that takes the synchronization packet Y as a start. The two evaluation results #k are obtained from the evaluation performed by the upstream and downstream monitoring points on a same object in the video stream.

In this embodiment, after finding the evaluation result #k, the upstream monitoring point may first determine whether evaluation ranges corresponding to the two evaluation results are consistent. Specifically, it can be determined whether the evaluation range corresponding to the local evaluation result #k and the evaluation range corresponding to the evaluation result #k in the evaluation result report message are consistent according to information about packets, for example, packet attribute values, within the evaluation range. If yes, the process in which the two evaluation results are compared may be performed; if not, this indicates that a mismatch occurs between an upstream evaluation range and a downstream evaluation range, and in this case, the evaluation result value can be used only as a reference and cannot be used for fault locating; in addition, a fault may be located according to network-layer indicators (such as packet loss, delay, and jitter) corresponding to the downstream evaluation range, and specifically, the location of an IPTV fault is determined by comparing the network-layer indicators within the evaluation range of the downstream evaluation result with network-layer indicators within a corresponding local evaluation range. After the locating process ends, synchronization is performed again.

Figure 13:
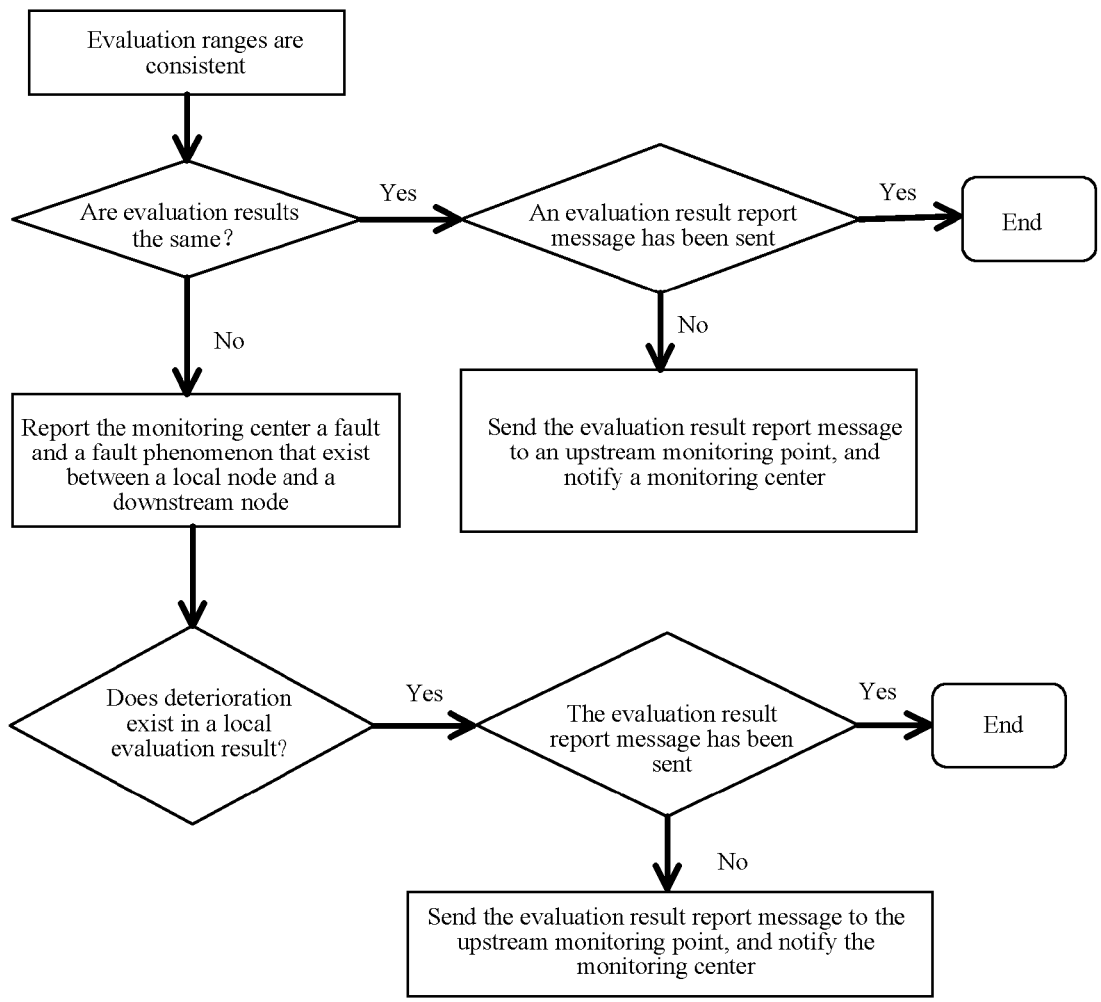
FIG. 13 is a schematic flowchart of a manner for locating a fault when evaluation ranges are consistent in an embodiment of a method for locating an IPTV fault according to the present disclosure.

Specifically, reference may be made to FIG. 13 for a process in which upstream and downstream evaluation results are compared. FIG. 13 is a schematic flowchart of a manner for locating a fault when evaluation ranges are consistent in an embodiment of a method for locating an IPTV fault according to the present disclosure, where the evaluation results for comparison are video quality evaluation values obtained from calculation based on the evaluation algorithm. The following three major conditions are included:

if the corresponding upstream evaluation result of the local (the local here refers to the upstream monitoring point) and the downstream evaluation result are not the same and no deterioration occurs in the local upstream evaluation result, this indicates that a fault (it may be a device fault or a link fault) exists between a local device and a device at the downstream monitoring point, and the upstream monitoring point directly reports a faulty region, and an application-layer phenomenon (for example, video deterioration degree) and a network-layer phenomenon (such as packet loss, delay, and jitter) that are induced by the fault to the monitoring center;

if the local upstream evaluation result and the downstream evaluation result are not the same, and deterioration exists in the local upstream evaluation result but a deterioration degree of the local upstream evaluation result is lower than that of the downstream evaluation result of the downstream monitoring point and is not lower than the threshold, this indicates that accumulation of faults in a region between the local and downstream monitoring points leads to the downstream evaluation result with a video quality evaluation value lower than the threshold; in this case, the local monitoring point may report the faulty region and a corresponding fault phenomenon, such as a relative deterioration degree of an application-layer video, and network-layer packet loss, delay, and jitter to the monitoring center; if a video quality evaluation value of the local upstream evaluation result is lower than the threshold and the evaluation result report message for the evaluation result has not been previously sent to the upstream monitoring point, the evaluation result report message is sent to the local upstream monitoring point and the monitoring center is notified; if the evaluation result report message has already been sent to the local upstream monitoring point, resending is unnecessary; if the video quality evaluation value of the local upstream evaluation result is higher than the threshold but deterioration exists, the local result still needs to be sent to the upstream monitoring point in a form of the evaluation result report message, so that, according to this, the local upstream monitoring point determines whether a fault exists between the local and the local upstream monitoring point; and if the local upstream evaluation result value and the downstream evaluation result value are the same, this indicates that no fault exists between the local device and the device at the downstream monitoring point, and therefore it is locally checked whether the evaluation result report message for the evaluation result has already been sent to the local upstream monitoring point; if yes, resending is unnecessary; otherwise, the local evaluation result needs to be sent in the same way to the local upstream monitoring point, and the monitoring center is notified, so that, according to this, the local upstream monitoring point determines whether a fault exists between the local and the local upstream monitoring point.

Figure 14:
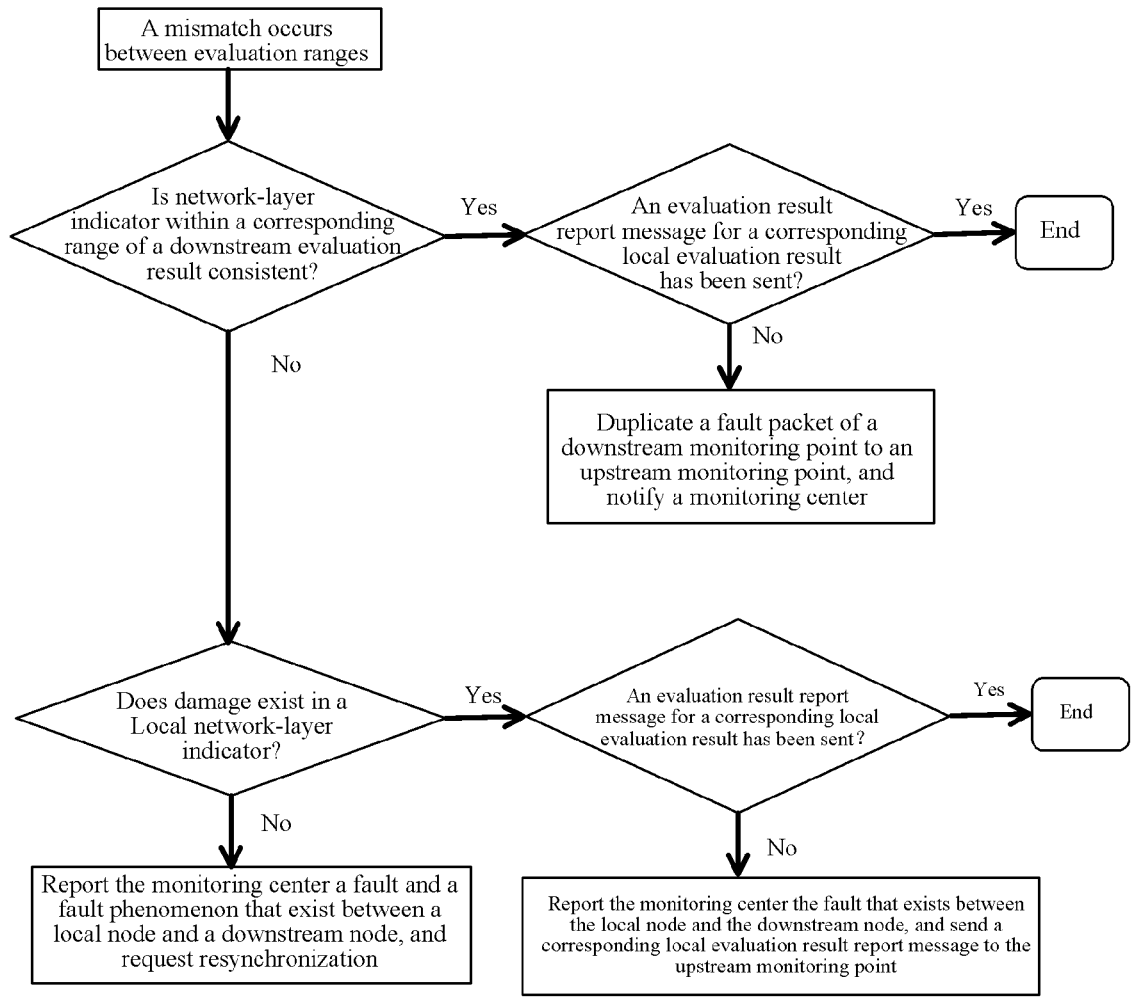
FIG. 14 is a schematic flowchart of a manner for locating a fault when evaluation ranges are inconsistent in an embodiment of a method for locating an IPTV fault according to the present disclosure.

Specifically, FIG. 14 is a schematic flowchart of a manner for locating a fault when evaluation ranges are inconsistent in an embodiment of a method for locating an IPTV fault according to the present disclosure. As shown in FIG. 14, when a mismatch occurs between an upstream evaluation range and a downstream evaluation range, a video quality evaluation value corresponding to an evaluation result cannot be used to perform fault locating. In this case, fault locating needs to be performed according to network-layer indicators, such as a sequence number of a lost packet and packet delay, where these network-layer indicators are carried in the downstream evaluation result.

For example, when a mismatch occurs between the evaluation ranges, it is determined whether network-layer indicators within the evaluation range corresponding to the evaluation result of the local monitoring point is consistent with that corresponding to the evaluation result of the downstream monitoring point, if network-layer indicators within the evaluation range corresponding to the evaluation result of the local monitoring point are consistent with that corresponding to the evaluation result of the downstream monitoring point, this indicates that no fault exists between the local monitoring point and the downstream monitoring point, and therefore it is locally checked whether the evaluation result report message for the corresponding evaluation result has already been sent to the local upstream monitoring point; if yes, resending is unnecessary; otherwise, the evaluation result report message of the downstream monitoring point needs to be duplicated to the local upstream monitoring point, and the monitoring center is notified, so that the local upstream monitoring point determines whether a fault exists between the local and the local upstream monitoring point through comparison.

If the network-layer indicators within the evaluation range corresponding to the local evaluation result are inconsistent with that corresponding to the evaluation result of the downstream monitoring point and no deterioration exists in the local network-layer indicators, this indicates that a fault exists between the local device and the device at the downstream monitoring point, and the local monitoring point directly reports the monitoring center the fault that exists between the local and downstream monitoring point, and an application-layer phenomenon (for example, video deterioration degree) and a network-layer phenomenon (such as, packet loss, delay, and jitter) that are induced by the fault.

If the network-layer indicators within the evaluation range corresponding to the evaluation result of the local monitoring point are inconsistent with that corresponding to the evaluation result of the downstream monitoring point, and damage exists in the local network-layer indicators but the damage degree is lower than the deterioration degree of the downstream monitoring point, this indicates that accumulation of faults in a region between the local and downstream monitoring points leads to the downstream network-layer indicators lower than the threshold. In this case, if the evaluation result report message for the corresponding evaluation result has not been sent to the upstream monitoring point, the evaluation result report message is sent to the local upstream monitoring point, and the monitoring center is notified of the fault that exists between the local and the downstream monitoring point; if the evaluation result report message has already been sent to the local upstream monitoring point, resending is unnecessary.

According to the method for locating an IPTV fault in this embodiment, it can be determined whether a fault exists in a region between an upstream monitoring point and a downstream monitoring point by comparing an upstream evaluation result with a downstream evaluation result of a same media packet, thereby implementing IPTV fault locating.

Embodiment 5

Figure 15:
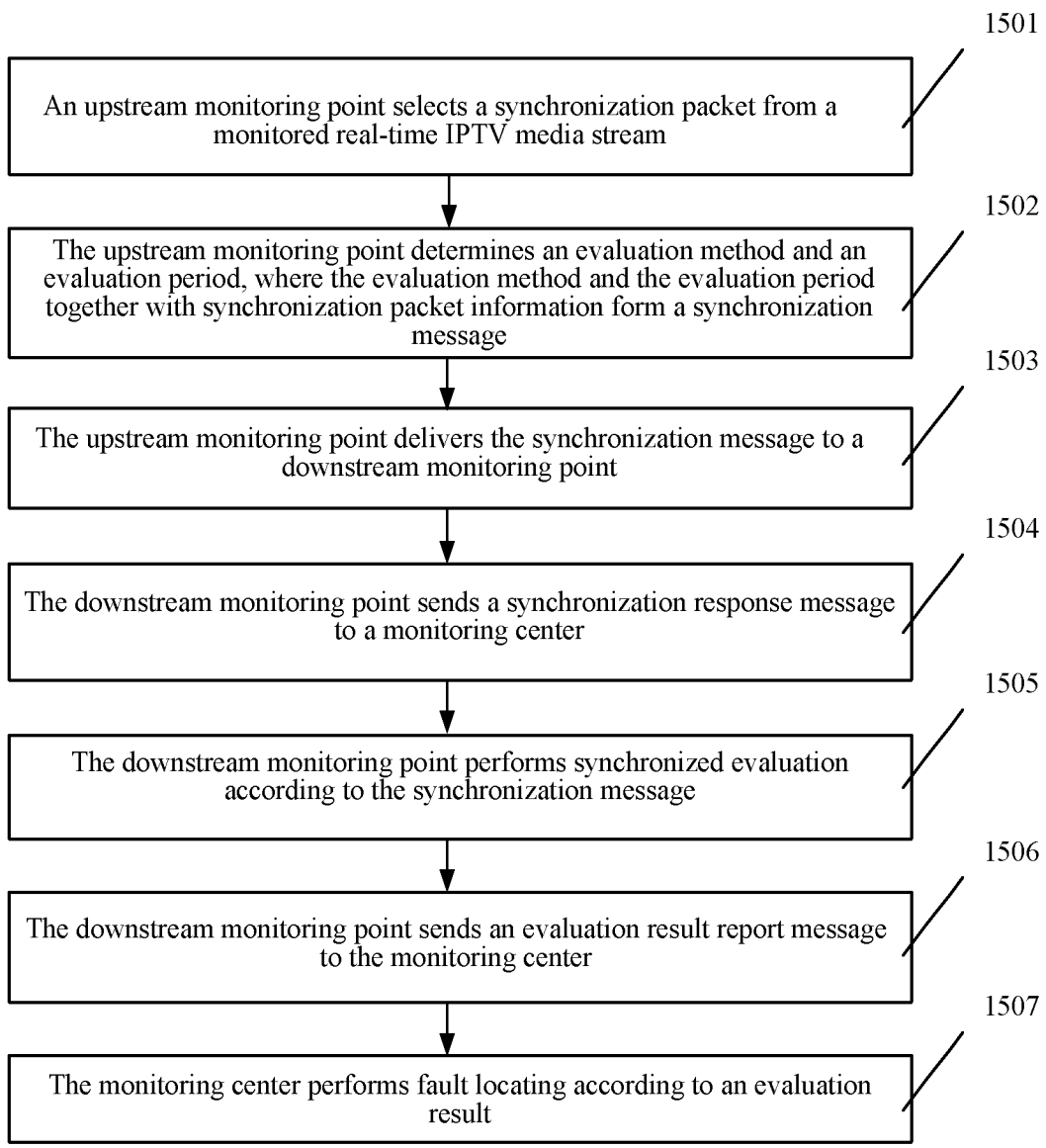
FIG. 15 is a schematic flowchart of still another embodiment of a method for locating an IPTV fault according to the present disclosure.
Figure 16:
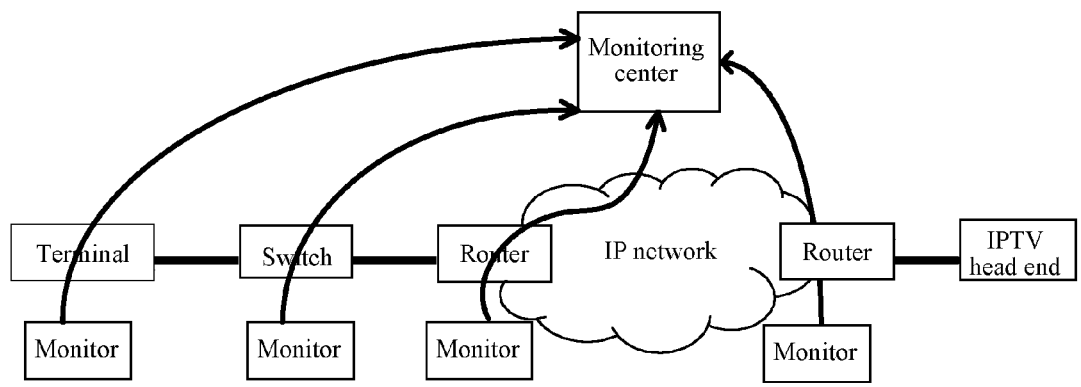
FIG. 16 is a schematic diagram of centralized fault locating in still another embodiment of a method for locating an IPTV fault according to the present disclosure.

FIG. 15 is a schematic flowchart of still another embodiment of a method for locating an IPTV fault according to the present disclosure. FIG. 16 is a schematic diagram of centralized fault locating in still another embodiment of a method for locating an IPTV fault according to the present disclosure. This embodiment differs from the embodiment shown in FIG. 3 in the following: In the method for locating an IPTV fault in this embodiment, a centralized locating method is used, and IPTV fault locating is completed by a monitoring center.

This embodiment gives a detailed description about parts in which the centralized manner differs from the distributed manner. Other same steps as those of the distributed manner are only briefly described, and reference may be made to the embodiment of the distributed manner. As shown in both FIG. 15 and FIG. 16, the method may include the following steps:

Step 1501: An upstream monitoring point selects a synchronization packet from a monitored IPTV video stream.

Step 1502: The upstream monitoring point determines a synchronization identifier that uniquely identifies the synchronization packet and synchronization packet information that includes the synchronization identifier, and further determines an evaluation method and an evaluation period, where the evaluation method, the evaluation period, and the synchronization packet information together form a synchronization message.

Step 1503: The upstream monitoring point sends the synchronization message to a downstream monitoring point.

The upstream monitoring point may forward the synchronization message to the downstream monitoring point through the monitoring center, and in this step, the monitoring center may store the synchronization message, so that the monitoring center performs fault locating subsequently according to the synchronization message.

Step 1504: The downstream monitoring point sends a synchronization response message to the monitoring center.

Step 1505: The downstream monitoring point performs synchronized evaluation according to the synchronization message.

In this step, the downstream monitoring point may send the synchronization response message to the monitoring center or the upstream monitoring point. If the synchronization response message is sent to the monitoring center, the monitoring center needs to receive the synchronization packet information and initial evaluation packet information that are sent by the upstream monitoring point, compare the synchronization packet information and the initial evaluation packet information of the upstream monitoring point with that of the downstream monitoring point to determine whether the synchronization packet and an initial evaluation packet of the upstream monitoring point are consistent with that of the downstream monitoring point.

If not, the monitoring center may notify the upstream monitoring point, so that the upstream monitoring point sends a new synchronization message to the downstream monitoring point, where the new synchronization message includes a new evaluation method.

Step 1506: The downstream monitoring point sends an evaluation result report message to the monitoring center.

In the distributed manner, the evaluation result report message is finally sent to the upstream monitoring point because fault locating is performed by the upstream monitoring point; while in this embodiment, fault locating is performed by the monitoring center, and therefore the evaluation result report message needs to be sent to the monitoring center.

It should be noted that, in the centralized locating method in this embodiment, the downstream monitoring point sends the evaluation result report message to the upstream monitoring point only when a video quality evaluation value in a downstream evaluation result is lower than a set threshold, which indicates that a fault occurs in the IPTV video stream. If the video quality evaluation value is not lower than the set threshold, the evaluation result report message is not sent; whereas the upstream monitoring point sends an evaluation result to the monitoring center after obtaining the evaluation result no matter whether its video quality evaluation value is lower than the threshold, and this is because a fault location may be located by comparing an upstream evaluation result with the downstream evaluation result even if the upstream evaluation result of the upstream monitoring point is not lower than the threshold. That is, a fault definitely occurs between the upstream monitoring point and the downstream monitoring point.

In this embodiment, the monitoring center further receives upstream evaluation results and the synchronization packet information that are sent by the upstream monitoring point, so that the evaluation result of the upstream monitoring point may be subsequently compared with that of the downstream monitoring point.

The downstream evaluation result is carried in the evaluation result report message, where the evaluation result report message also includes the synchronization packet information and an evaluation result identifier that is used to uniquely identify the downstream evaluation result.

Step 1507: The monitoring center performs fault locating according to an evaluation result.

When the monitoring center discovers that the evaluation result sent by a certain monitoring point is lower than the set threshold and fault locating needs to be activated, the monitoring center finds, according to the synchronization packet and an evaluation result number, the evaluation result corresponding to the upstream monitoring point.

Specifically, from the evaluation result report message sent by the upstream monitoring point, the monitoring center may find, according to the synchronization packet information and the evaluation result identifier in the evaluation result report message sent by the downstream monitoring point, the upstream evaluation result corresponding to the downstream evaluation result. For the corresponding upstream and downstream evaluation results that have been found, the monitoring center further determines whether an evaluation range of the downstream monitoring point is consistent with an evaluation range of the upstream monitoring point according to information about packets within the evaluation ranges corresponding to the evaluation results.

If yes, the upstream evaluation result and the downstream evaluation result are compared and a fault is located. For example, if no deterioration exists in the upstream evaluation result or a deterioration degree of the upstream evaluation result is lower than that of the downstream evaluation result, it is determined that a fault occurs between the upstream monitoring point and the downstream monitoring point.

If not, the monitoring center compares network-layer indicators within the evaluation range of the downstream evaluation result with network-layer indicators within the corresponding evaluation range of the upstream monitoring point and determines the location of an IPTV fault.

According to the method for locating an IPTV fault in this embodiment, it can be determined whether a fault exists in a region between an upstream monitoring point and a downstream monitoring point by comparing an upstream evaluation result with a downstream evaluation result of a same media packet, thereby implementing IPTV fault locating.

Embodiment 6

Figure 17:
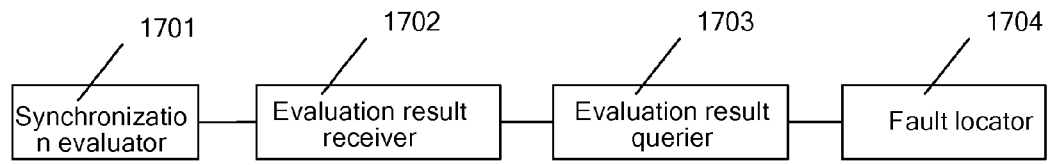
FIG. 17 is a schematic structural diagram of an embodiment of an apparatus for locating an IPTV fault according to the present disclosure.

FIG. 17 is a schematic structural diagram of an embodiment of an apparatus for locating an IPTV fault according to the present disclosure. The apparatus in this embodiment may be an upstream monitoring point or a monitoring center and may execute the method for locating a fault in any embodiment of the present disclosure. This embodiment gives a brief description about a structure of the apparatus. For its specific working principle, reference may be made to the description in any method embodiment of the present disclosure.

As shown in FIG. 17, the apparatus may include: a synchronization evaluator 1701, an evaluation result receiver 1702, an evaluation result querier 1703, and a fault locator 1704.

The synchronization evaluator 1701 is configured to acquire multiple upstream evaluation results, where the upstream evaluation results are obtained from synchronized evaluation performed, according to a synchronization message, by the upstream monitoring point on a monitored IPTV video stream, the synchronization message includes synchronization packet information, an evaluation method, and an evaluation period, the synchronization packet information includes a synchronization identifier that uniquely identifies a synchronization packet, and the synchronization packet is a media packet selected from the IPTV video stream.

For example, if the apparatus for locating a fault in this embodiment is a monitoring point arranged in a transmission path of the IPTV video stream in a distributed locating manner, the monitoring point itself may perform an evaluation on the IPTV video stream and obtain the upstream evaluation results.

For example, if the apparatus for locating a fault in this embodiment is a monitoring center in a centralized locating manner, the monitoring center may obtain the upstream evaluation results from a monitoring point arranged in the transmission path of the IPTV video stream, and the upstream monitoring point sends the upstream evaluation results obtained from an evaluation performed by itself to the monitoring center.

The evaluation result receiver 1702 is configured to receive an evaluation result report message sent by a downstream monitoring point, where the evaluation result report message includes a downstream evaluation result, an evaluation result identifier, and the synchronization packet information.

The evaluation result querier 1703 is configured to find, according to the synchronization packet information and the evaluation result identifier in the evaluation result report message sent by the downstream monitoring point, an upstream evaluation result corresponding to the downstream evaluation result.

The fault locator 1704 is configured to compare the downstream evaluation result with the upstream evaluation result and perform fault locating according to a result of the comparison.

According to the apparatus for locating an IPTV fault in this embodiment, it can be determined whether a fault exists in a region between an upstream monitoring point and a downstream monitoring point by comparing an upstream evaluation result with a downstream evaluation result of a same media packet, thereby implementing IPTV fault locating.

Embodiment 7

Figure 18:
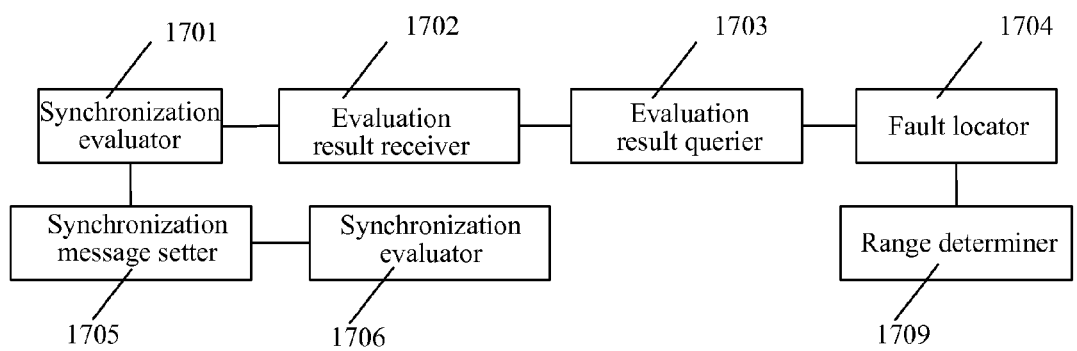
FIG. 18 is a schematic structural diagram of another embodiment of an apparatus for locating an IPTV fault according to the present disclosure.

FIG. 18 is a schematic structural diagram of another embodiment of an apparatus for locating an IPTV fault according to another embodiment of the present disclosure. The apparatus in this embodiment may be an upstream monitoring point and may execute the method for locating a fault in any embodiment of the present disclosure. This embodiment gives a brief description about a structure of the apparatus. For its specific working principle, reference may be made to the description in any method embodiment of the present disclosure.

According to this embodiment, the upstream monitoring point may include an IPTV head-end monitoring point and a monitoring point other than the IPTV head-end monitoring point. Accordingly, as shown in FIG. 18, the structure of the upstream monitoring point in this embodiment may have two structural patterns.

For example, if the apparatus is an upstream monitoring point other than the IPTV head-end monitoring point in a transmission path of an IPTV video stream, a synchronization evaluator 1701 in the apparatus is further configured to receive, before synchronized evaluation is performed on the monitored IPTV video stream according to a synchronization message, the synchronization message sent by the IPTV head-end monitoring point of the IPTV video stream, and the IPTV head-end monitoring point is a monitoring point that the IPTV video stream flows through first.

For example, if the apparatus is the IPTV head-end monitoring point in the transmission path of the IPTV video stream, the apparatus may further include a synchronization message setter 1705.

The synchronization message setter 1705 is configured to select a media packet from the IPTV video stream as the synchronization packet, determine the synchronization identifier and synchronization packet information that includes the synchronization identifier; and set the evaluation method, an evaluation period, and the synchronization message.

Furthermore, when the apparatus for locating an IPTV fault in this embodiment is the IPTV head-end monitoring point, the apparatus may further include: a synchronization evaluator 1706, configured to receive a synchronization response message sent by the downstream monitoring point, where the synchronization response message includes initial evaluation packet information and the synchronization packet information; compare the synchronization packet information and the initial evaluation packet information with local synchronization packet information and initial evaluation packet information respectively to determine whether they are consistent; and when either the synchronization packet information or the initial evaluation packet information is inconsistent, send a new synchronization message to the downstream monitoring point, where the new synchronization message includes a new evaluation method.

Furthermore, for all upstream monitoring points in the transmission path of the IPTV video stream, a fault locator 1704 in this embodiment is specifically configured to: during fault locating, determine that a fault occurs between a local monitoring point and the downstream monitoring point when deterioration occurs in the downstream evaluation result compared with the upstream evaluation result.

Furthermore, the apparatus in this embodiment may further include: a range determiner 1709, configured to determine whether an evaluation range of the downstream monitoring point is consistent with a local evaluation range according to information about packets within the evaluation ranges; if yes, instruct the fault locator to compare a video quality evaluation value in the downstream evaluation result with a video quality evaluation value in the upstream evaluation result; if not, instruct the fault locator to compare network-layer indicators within the evaluation range of the downstream evaluation result with network-layer indicators within the corresponding evaluation range of a local upstream evaluation result, and determine a location of an IPTV fault.

According to the apparatus for locating an IPTV fault in this embodiment, it can be determined whether a fault exists in a region between an upstream monitoring point and a downstream monitoring point by comparing an upstream evaluation result with a downstream evaluation result of a same media packet, thereby implementing IPTV fault locating.

Embodiment 8

Figure 19:
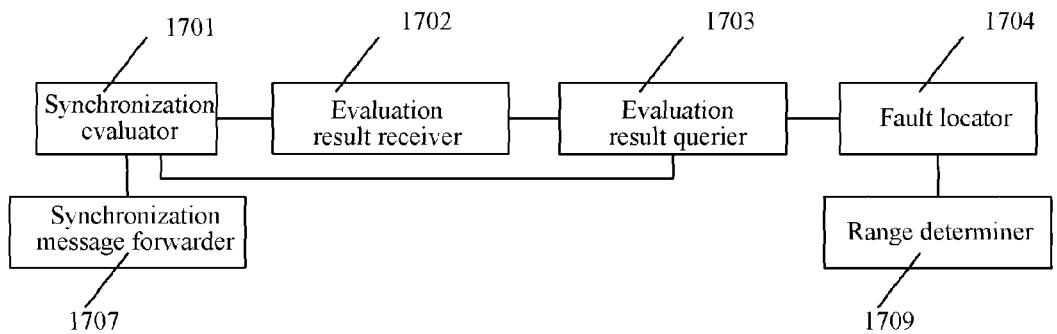
FIG. 19 is a schematic structural diagram of still another embodiment of an apparatus for locating an IPTV fault according to the present disclosure.

FIG. 19 is a schematic structural diagram of still another embodiment of an apparatus for locating an IPTV fault according to the present disclosure. The apparatus in this embodiment may be a monitoring center and may execute the method for locating a fault in any embodiment of the present disclosure. This embodiment gives a brief description about a structure of the apparatus. For its specific working principle, reference may be made to the description in any method embodiment of the present disclosure.

As shown in FIG. 19 and based on the structure shown in FIG. 17, the monitoring center in this embodiment may further include a synchronization message forwarder 1707.

The synchronization message forwarder 1707 is configured to send the synchronization message to the downstream monitoring point after receiving the synchronization message sent by an IPTV head-end monitoring point of an IPTV video stream.

The synchronization evaluator 1701 may be specifically configured to receive upstream evaluation results and synchronization packet information that are sent by an upstream monitoring point, where the upstream monitoring point includes the IPTV head-end monitoring point.

Furthermore, the apparatus in this embodiment may further include: a range determiner 1709, configured to determine whether an evaluation range of the downstream monitoring point is consistent with a local evaluation range according to information about packets within the evaluation ranges; if yes, instruct the fault locator to compare a video quality evaluation value in a downstream evaluation result with a video quality evaluation value in the upstream evaluation result; if not, instruct the fault locator to compare network-layer indicators within the evaluation range of the downstream evaluation result with network-layer indicators within the corresponding evaluation range of a local upstream evaluation result, and determine a location of an IPTV fault.

According to the apparatus for locating an IPTV fault in this embodiment, it can be determined whether a fault exists in a region between an upstream monitoring point and a downstream monitoring point by comparing an upstream evaluation result with a downstream evaluation result of a same media packet, thereby implementing IPTV fault locating.

Embodiment 9

Figure 20:
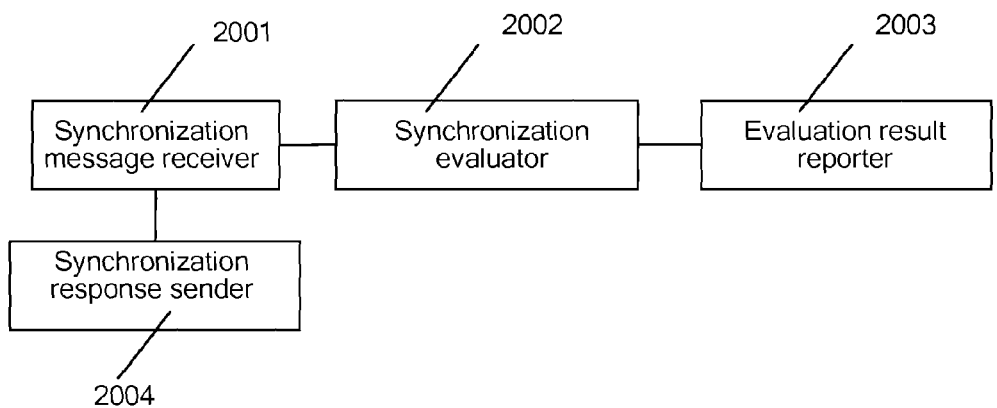
FIG. 20 is a schematic structural diagram of still another embodiment of an apparatus for locating an IPTV fault according to the present disclosure.

FIG. 20 is a schematic structural diagram of still another embodiment of an apparatus for locating an IPTV fault according to the present disclosure. The apparatus in this embodiment may be a downstream monitoring point and may execute the method for locating a fault in any embodiment of the present disclosure. This embodiment gives a brief description about a structure of the apparatus. For its specific working principle, reference may be made to the description in any method embodiment of the present disclosure.

As shown in FIG. 20, the apparatus may include: a synchronization message receiver 2001, a synchronization evaluator 2002, and an evaluation result reporter 2003.

The synchronization message receiver 2001 is configured to receive a synchronization message sent by an upstream monitoring point or a monitoring center, where the synchronization message includes synchronization packet information, an evaluation method, and an evaluation period, the synchronization packet information includes a synchronization identifier that uniquely identifies a synchronization packet, and the synchronization packet is a media packet selected from a monitored IPTV video stream.

The synchronization evaluator 2002 is configured to perform synchronized evaluation on the IPTV video stream according to the synchronization message to obtain a downstream evaluation result.

The evaluation result reporter 2003 is configured to send an evaluation result report message to the upstream monitoring point or the monitoring center, where the evaluation result report message includes the downstream evaluation result, an evaluation result identifier, and the synchronization packet information, so that the upstream monitoring point or the monitoring center finds, according to the synchronization packet information and the evaluation result identifier, an upstream evaluation result corresponding to the downstream evaluation result, compares the downstream evaluation result with the upstream evaluation result, and performs fault locating according to a result of the comparison.

Furthermore, the apparatus may include a synchronization response sender 2004, configured to send a synchronization response message to the monitoring center or an IPTV head-end monitoring point of the upstream monitoring point, where the synchronization response message includes the synchronization packet information and initial evaluation packet information, so that the IPTV head-end monitoring point or the monitoring center compares the synchronization packet information and the initial evaluation packet information with the synchronization packet information and initial evaluation packet information of the upstream monitoring point respectively to determine whether they are consistent.

When they are inconsistent, the synchronization message receiver 2001 is further configured to accordingly receive a new synchronization message that is directly sent by the IPTV head-end monitoring point or forwarded by the monitoring center, where the new synchronization message includes a new evaluation method.

Furthermore, the evaluation result reporter 2003 in the apparatus is specifically configured to send the evaluation result report message to the monitoring center, so that the monitoring center sends the evaluation result report message to the upstream monitoring point; or send the evaluation result report message directly to the upstream monitoring point.

Furthermore, the evaluation result reporter 2003 in the apparatus is further configured to send the evaluation result report message to the monitoring center while sending the evaluation result report message directly to the upstream monitoring point.

Furthermore, the evaluation result reporter 2003 in the apparatus is further configured to set in the evaluation result report message information about packets within evaluation ranges and network-layer indicators within the evaluation ranges, where the evaluation result report message is sent to the upstream monitoring point or the monitoring center, so that the upstream monitoring point or the monitoring center determines whether a local evaluation range is consistent with an evaluation range of the upstream monitoring point according to the information about the packets within the evaluation ranges; if yes, compares a video quality evaluation value in the downstream evaluation result with that in the upstream evaluation result; and if not, compares network-layer indicators within an evaluation range of the downstream monitoring point with network-layer indicators within the corresponding evaluation range of the upstream monitoring point, and determines a location of an IPTV fault.

According to the apparatus for locating an IPTV fault in this embodiment, it can be determined whether a fault exists in a region between an upstream monitoring point and a downstream monitoring point by comparing an upstream evaluation result with a downstream evaluation result of a same media packet, thereby implementing IPTV fault locating, saving costs of manpower and material resources, and improving efficiency in fault locating.

Embodiment 10

Figure 21:
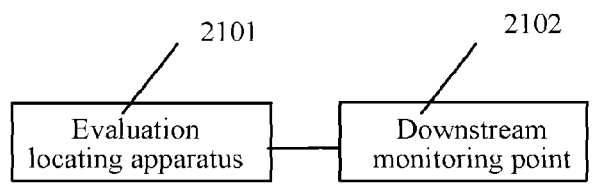
FIG. 21 is a schematic structural diagram of an embodiment of a system for locating an IPTV fault according to the present disclosure.

FIG. 21 is a schematic structural diagram of an embodiment of a system for locating an IPTV fault according to the present disclosure. The system in this embodiment may execute the method for locating a fault in any embodiment of the present disclosure. This embodiment gives a brief description about a structure of the system. For its specific working principle, reference may be made to the description in any method embodiment of the present disclosure.

As shown in FIG. 21, the system may include: an evaluation locating apparatus 2101 and a downstream monitoring point 2102.

The evaluation locating apparatus 2101 is configured to acquire multiple upstream evaluation results, where the upstream evaluation results are obtained from synchronized evaluation performed, according to a synchronization message, by an upstream monitoring point on a monitored IPTV video stream, the synchronization message includes synchronization packet information, an evaluation method, and an evaluation period, the synchronization packet information includes a synchronization identifier that uniquely identifies a synchronization packet, and the synchronization packet is a media packet selected from the IPTV video stream; receive an evaluation result report message sent by the downstream monitoring point, where the evaluation result report message includes a downstream evaluation result, an evaluation result identifier, and the synchronization packet information; find, according to the synchronization packet information and the evaluation result identifier in the evaluation result report message sent by the downstream monitoring point, an upstream evaluation result corresponding to the downstream evaluation result; and compare the downstream evaluation result with the upstream evaluation result, and perform fault locating according to a result of the comparison.

For example, if the system for locating a fault in this embodiment works in a distributed locating manner, the evaluation locating apparatus 2101 may be an upstream monitoring point in a transmission path of the IPTV video stream; if the system for locating a fault in this embodiment works in a centralized locating manner, the evaluation locating apparatus 2101 may be a monitoring center, and in this case, the monitoring center acquires or obtains the upstream evaluation result from the upstream monitoring point in the transmission path of the IPTV video stream.

The downstream monitoring point 2102 is configured to receive the synchronization message, perform, according to the synchronization message, synchronized evaluation on the IPTV video stream to obtain the downstream evaluation result, and send the evaluation result report message to the upstream monitoring point or the monitoring center.

According to the system for locating an IPTV fault in this embodiment, it can be determined whether a fault exists in a region between an upstream monitoring point and a downstream monitoring point by comparing an upstream evaluation result with a downstream evaluation result of a same media packet, thereby implementing IPTV fault locating, saving costs of manpower and material resources, and improving efficiency in fault locating.

It may be clearly understood by persons skilled in the art that, for the purpose of convenient and brief description, for a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of a software functional unit.

When the integrated unit are implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of steps of the methods described in the embodiments of the present disclosure. The foregoing storage medium includes: any medium that is capable of storing program codes, such as a USB flash disk, a removable hard disk, a read-only memory (ROM), a random access memory (RAM,), a magnetic disk, or an optical disk.

Persons of ordinary skills in the art may understand that all or part of steps in the embodiments of the present disclosure may be implemented by a program instructing relevant hardware. The program may be stored in a computer readable storage medium. When the program is run, the foregoing steps of the methods in the embodiments are performed. The foregoing storage medium includes any medium that is capable of storing program codes, such as a ROM, a RAM, a magnetic disk or an optical disk.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method for locating an Internet Protocol television (IPTV) fault, comprising:

acquiring an upstream evaluation result, wherein the upstream evaluation result is obtained from a synchronized evaluation performed, according to a synchronization message, by an upstream monitoring point on a monitored IPTV video stream, the synchronization message comprises synchronization packet information, an evaluation method, and an evaluation period, the synchronization packet information comprises a synchronization identifier that uniquely identifies a synchronization packet, and the synchronization packet is a media packet selected from the IPTV video stream; wherein the evaluation method is used to instruct a downstream monitoring point how to perform an evaluation on the IPTV media stream and comprises: taking the synchronization packet as a start, the evaluation begins at a key frame that is met first after a preceding evaluation period ends, and the evaluation result of a first evaluation period is taken as a first evaluation result of the synchronization;

receiving an evaluation result report message sent by a downstream monitoring point, wherein the evaluation result report message comprises a downstream evaluation result, an evaluation result identifier, and the synchronization packet information;

finding, according to the synchronization packet information and the evaluation result identifier in the evaluation result report message sent by the downstream monitoring point, the upstream evaluation result corresponding to the downstream evaluation result; and comparing the downstream evaluation result with the upstream evaluation result, and performing fault locating according to a result of the comparison.

2. The method for locating an IPTV fault according to claim 1, before the synchronized evaluation is performed on the monitored IPTV video stream according to the synchronization message, further comprising:

receiving the synchronization message sent by an IPTV head-end monitoring point of the IPTV video stream, wherein the IPTV head-end monitoring point is a monitoring point that the IPTV video stream flows through first.

3. The method for locating an IPTV fault according to claim 1, before the synchronized evaluation is performed on the monitored IPTV video stream according to the synchronization message, further comprising:

selecting the media packet from the IPTV video stream as the synchronization packet, determining the synchronization identifier and the synchronization packet information that comprises the synchronization identifier, and setting the evaluation method, the evaluation period, and the synchronization message.

4. The method for locating an IPTV fault according to claim 3, further comprising:

receiving a synchronization response message sent by the downstream monitoring point, wherein the synchronization response message comprises initial evaluation packet information and the synchronization packet information; and comparing the synchronization packet information and the initial evaluation packet information with local synchronization packet information and initial evaluation packet information respectively to determine whether they are consistent; and when either the synchronization packet information or the initial evaluation packet information is inconsistent, sending a new synchronization message to the downstream monitoring point, wherein the new synchronization message comprises a new evaluation method.

5. The method for locating an IPTV fault according to claim 2, wherein after the receiving the synchronization message sent by an IPTV head-end monitoring point of the IPTV video stream, the method further comprises: sending the synchronization message to the downstream monitoring point; and before the comparing the downstream evaluation result with the upstream evaluation result, the method further comprises:

receiving the synchronization packet information that is sent by the upstream monitoring point, wherein the upstream monitoring point comprises the IPTV head-end monitoring point.

6. The method for locating an IPTV fault according to claim 1, wherein the downstream evaluation result further comprises information about packets within an evaluation range and network-layer indicators within the evaluation range, and the method further comprises:

determining whether an evaluation range of the downstream monitoring point is consistent with a local evaluation range according to the information about the packets within the evaluation range; and if yes, comparing a video quality evaluation value in the downstream evaluation result with a video quality evaluation value in the upstream evaluation result; if not, comparing network-layer indicators within the evaluation range of the downstream evaluation result with network-layer indicators within the corresponding local evaluation range, and performing fault locating.

7. The method for locating an IPTV fault according to claim 1, wherein the downstream evaluation result and the upstream evaluation result further comprise application-layer indicators corresponding to the evaluation results and the application-layer indicators comprise a video quality evaluation parameter.

8. A method for locating an Internet Protocol television (IPTV) fault, comprising:

receiving a synchronization message sent by an upstream monitoring point or a monitoring center, wherein the synchronization message comprises synchronization packet information, an evaluation method, and an evaluation period, the synchronization packet information comprises a synchronization identifier that uniquely identifies a synchronization packet, and the synchronization packet is a media packet selected from a monitored IPTV video stream; wherein the evaluation method is used to instruct a downstream monitoring point how to perform an evaluation on the IPTV media stream and comprises: taking the synchronization packet as a start, the evaluation begins at a key frame that is met first after a preceding evaluation period ends, and the evaluation result of a first evaluation period is taken as a first evaluation result of the synchronization;

performing a synchronized evaluation on the IPTV video stream according to the synchronization message to obtain a downstream evaluation result; and sending an evaluation result report message to the upstream monitoring point or the monitoring center, wherein the evaluation result report message comprises the downstream evaluation result, an evaluation result identifier, and the synchronization packet information, so that the upstream monitoring point or the monitoring center finds, according to the synchronization packet information and the evaluation result identifier, an upstream evaluation result corresponding to the downstream evaluation result, compares the downstream evaluation result with the upstream evaluation result, and performs fault locating according to a result of the comparison.

9. The method for locating an IPTV fault according to claim 8, after the receiving a synchronization message sent by an upstream monitoring point or a monitoring center, further comprising:

sending a synchronization response message to the monitoring center or an IPTV head-end monitoring point of the upstream monitoring point, wherein the synchronization response message comprises the synchronization packet information and initial evaluation packet information, so that the IPTV head-end monitoring point or the monitoring center compares the synchronization packet information and the initial evaluation packet information with the synchronization packet information and initial evaluation packet information of the upstream monitoring point respectively to determine whether they are consistent; and when they are inconsistent, receiving a new synchronization message that is directly sent by the IPTV head-end monitoring point or forwarded by the monitoring center, wherein the new synchronization message comprises a new evaluation method.

10. The method for locating an IPTV fault according to claim 8, wherein the sending an evaluation result report message to the upstream monitoring point comprises:

sending the evaluation result report message to the monitoring center, so that the monitoring center sends the evaluation result report message to the upstream monitoring point; or sending the evaluation result report message directly to the upstream monitoring point.

11. The method for locating an IPTV fault according to claim 8, further comprising:

setting in the evaluation result report message information about packets within an evaluation range and network-layer indicators within the evaluation range, wherein the evaluation result report message is sent to the upstream monitoring point or the monitoring center, so that the upstream monitoring point or the monitoring center determines whether a local evaluation range is consistent with an evaluation range of the upstream monitoring point according to the information about the packets within the evaluation range; if yes, compares a video quality evaluation value in the downstream evaluation result with a video quality evaluation value in the upstream evaluation result; and if not, compares network-layer indicators within an evaluation range of the downstream evaluation result with network-layer indicators within the corresponding evaluation range of the upstream monitoring point, and determines a location of an IPTV fault.

12. An apparatus for locating an Internet Protocol television (IPTV) fault, comprising:

a synchronization evaluator, configured to acquire a upstream evaluation result, wherein the upstream evaluation result is obtained from a synchronized evaluation performed, according to a synchronization message, by an upstream monitoring point on a monitored IPTV video stream, the synchronization message comprises synchronization packet information, an evaluation method, and an evaluation period, the synchronization packet information comprises a synchronization identifier that uniquely identifies a synchronization packet, and the synchronization packet is a media packet selected from the IPTV video stream; wherein the evaluation method is used to instruct a downstream monitoring point how to perform an evaluation on the IPTV media stream and comprises: taking the synchronization packet as a start, the evaluation begins at a key frame that is met first after a preceding evaluation period ends, and the evaluation result of a first evaluation period is taken as a first evaluation result of the synchronization;

an evaluation result receiver, configured to receive an evaluation result report message sent by a downstream monitoring point, wherein the evaluation result report message comprises a downstream evaluation result, an evaluation result identifier, and the synchronization packet information;

an evaluation result querier, configured to find, according to the synchronization packet information and the evaluation result identifier in the evaluation result report message sent by the downstream monitoring point, the upstream evaluation result corresponding to the downstream evaluation result; and a fault locator, configured to compare the downstream evaluation result with the upstream evaluation result and perform fault locating according to a result of the comparison.

13. The apparatus for locating an IPTV fault according to claim 12, wherein the synchronization evaluator is further configured to receive, before the synchronized evaluation is performed on the monitored IPTV video stream according to the synchronization message, the synchronization message sent by an IPTV head-end monitoring point of the IPTV video stream, and the IPTV head-end monitoring point is a monitoring point that the IPTV video stream flows through first.

14. The apparatus for locating an IPTV fault according to claim 12, further comprising:

a synchronization message setter, configured to select the media packet from the IPTV video stream as the synchronization packet, determine the synchronization identifier and the synchronization packet information that comprises the synchronization identifier, and set the evaluation method, the evaluation period, and the synchronization message.

15. The apparatus for locating an IPTV fault according to claim 14, further comprising:

a synchronization evaluation, configured to receive a synchronization response message sent by the downstream monitoring point, wherein the synchronization response message comprises initial evaluation packet information and the synchronization packet information; compare the synchronization packet information and the initial evaluation packet information with local synchronization packet information and initial evaluation packet information respectively to determine whether they are consistent; and when either the synchronization packet information or the initial evaluation packet information is inconsistent, send a new synchronization message to the downstream monitoring point, wherein the new synchronization message comprises a new evaluation method.

16. The apparatus for locating an IPTV fault according to claim 13, further comprising:

a synchronization message forwarder, configured to send the synchronization message to the downstream monitoring point after receiving the synchronization message sent by the IPTV head-end monitoring point of the IPTV video stream; and the synchronization evaluator, configured to receive the synchronization packet information that is sent by the upstream monitoring point, wherein the upstream monitoring point comprises the IPTV head-end monitoring point.

17. The apparatus for locating an IPTV fault according to claim 12, further comprising:

a range determiner, configured to determine whether an evaluation range of the downstream monitoring point is consistent with a local evaluation range according to information about packets within the evaluation ranges; if yes, instruct the fault locator to compare a video quality evaluation value in the downstream evaluation result with a video quality evaluation value in the upstream evaluation result; if not, instruct the fault locator to compare network-layer indicators within the evaluation range of the downstream evaluation result with network-layer indicators within the corresponding evaluation range of a local upstream evaluation result, and determine a location of an IPTV fault.

18. An apparatus for locating an Internet Protocol television (IPTV) fault, comprising:

a synchronization message receiver, configured to receive a synchronization message sent by an upstream monitoring point or a monitoring center, wherein the synchronization message comprises synchronization packet information, an evaluation method, and an evaluation period, the synchronization packet information comprises a synchronization identifier that uniquely identifies a synchronization packet, and the synchronization packet is a media packet selected from a monitored IPTV video stream; wherein the evaluation method is used to instruct a downstream monitoring point how to perform an evaluation on the IPTV media stream and comprises: taking the synchronization packet as a start, the evaluation begins at a key frame that is met first after a preceding evaluation period ends, and the evaluation result of a first evaluation period is taken as a first evaluation result of the synchronization;

a synchronization evaluator, configured to perform a synchronized evaluation on the IPTV video stream according to the synchronization message and obtain a downstream evaluation result; and an evaluation result reporter, configured to send an evaluation result report message to the upstream monitoring point or the monitoring center, wherein the evaluation result report message comprises the downstream evaluation result, an evaluation result identifier, and the synchronization packet information, so that the upstream monitoring point or the monitoring center finds, according to the synchronization packet information and the evaluation result identifier, an upstream evaluation result corresponding to the downstream evaluation result, compares the downstream evaluation result with the upstream evaluation result, and performs fault locating according to a result of the comparison.

19. The apparatus for locating an IPTV fault according to claim 18, further comprising:

a synchronization response sender, configured to send a synchronization response message to the monitoring center or an IPTV head-end monitoring point of the upstream monitoring point, wherein the synchronization response message comprises the synchronization packet information and initial evaluation packet information, so that the IPTV head-end monitoring point or the monitoring center compares the synchronization packet information and the initial evaluation packet information with the synchronization packet information and initial evaluation packet information of the upstream monitoring point respectively to determine whether they are consistent; wherein the synchronization message receiver is further configured to receive, when they are inconsistent, a new synchronization message that is directly sent by the IPTV head-end monitoring point or forwarded by the monitoring center, wherein the new synchronization message comprises a new evaluation method.

20. The apparatus for locating an IPTV fault according to claim 18, wherein the evaluation result reporter is further configured to set in the evaluation result report message information about packets within an evaluation range and network-layer indicators within the evaluation range, wherein the evaluation result report message is sent to the upstream monitoring point or the monitoring center, so that the upstream monitoring point or the monitoring center determines whether a local evaluation range is consistent with an evaluation range of the upstream monitoring point according to the information about the packets within the evaluation range; if yes, compares a video quality evaluation value in the downstream evaluation result with a video quality evaluation value in the upstream evaluation result; and if not, compares network-layer indicators within an evaluation range of the downstream evaluation result with network-layer indicators within the corresponding evaluation range of the upstream monitoring point, and determines a location of an IPTV fault.

* * * * *